(12) United States Patent
Yamamoto

(10) Patent No.: US 7,729,073 B2
(45) Date of Patent: Jun. 1, 2010

(54) MAGNETIC RECORDING DISK AND DISK DRIVE WITH AMPLITUDE-TYPE SERVO FIELDS HAVING PATTERNED SERVO ISLANDS FOR READ/WRITE HEAD POSITIONING

(75) Inventor: Satoshi Yamamoto, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 277 days.

(21) Appl. No.: 11/871,259

(22) Filed: Oct. 12, 2007

(65) Prior Publication Data

US 2009/0097160 A1    Apr. 16, 2009

(51) Int. Cl.
G11B 5/09    (2006.01)

(52) U.S. Cl. .................... 360/48; 360/40; 360/135

(58) Field of Classification Search ............... None
See application file for complete search history.

(56) References Cited

U.S. PATENT DOCUMENTS

| | | | |
|---|---|---|---|
| 4,549,232 A | 10/1985 | Axmear et al. | |
| 4,912,585 A | 3/1990 | Belser et al. | |
| 5,587,223 A | 12/1996 | White | |
| 5,820,769 A | 10/1998 | Chou | |
| 6,383,598 B1 | 5/2002 | Fullerton et al. | |
| 6,529,341 B1* | 3/2003 | Ishida et al. | 360/48 |
| 6,754,016 B2 | 6/2004 | Messner et al. | |
| 2005/0213235 A1* | 9/2005 | Yasunaga | 360/17 |
| 2006/0082913 A1* | 4/2006 | Niitsuma et al. | 360/48 |
| 2006/0280975 A1 | 12/2006 | Albrecht et al. | |
| 2007/0230055 A1* | 10/2007 | Shirotori et al. | 360/135 |

FOREIGN PATENT DOCUMENTS

JP    11224422 A  *  8/1999

OTHER PUBLICATIONS

Lin, "Investigation of advanced position error signal patterns in patterned media", J. Appl. Phys., vol. 87, No. 9, May 1, 2000, pp. 5117-5119.
Baker, "Direct print servo patterns for disk drive", J. Appl. Phys., vol. 97, 10P105 (2005).

* cited by examiner

*Primary Examiner*—Jason C Olson
(74) *Attorney, Agent, or Firm*—Thomas R. Berthold

(57) ABSTRACT

A magnetic recording disk drive has a disk with pre-patterned nondata servo sectors extending generally radially across the data tracks. The disk may be a patterned-media disk with both pre-patterned data islands and pre-patterned nondata servo sectors. The servo sectors include a synchronization pattern of generally radially directed discrete magnetized marks, and first and second position error signal (PES) fields of generally radially directed discrete magnetized stripes. Each stripe in each of the two fields comprises a plurality of radially spaced discrete servo islands, each island having a radial height of approximately Tp, where Tp is the radial spacing of the track centerlines. In each field, the servo islands in alternating stripes in the along-the-track direction are shifted radially by approximately Tp. In the first PES field, the islands are centered at the midline between two adjacent track centerlines, and in the second PES field the islands are centered at a track centerline. All of the servo islands in the two PES fields have the same magnetization direction.

14 Claims, 18 Drawing Sheets

MAGNETIC RECORDING DISK AND DISK DRIVE WITH AMPLITUDE-TYPE SERVO FIELDS HAVING PATTERNED SERVO ISLANDS FOR READ/WRITE HEAD POSITIONING

RELATED APPLICATION

This application is related to pending application Ser. No. 11/840,900 filed Aug. 17, 2007 and titled "MAGNETIC RECORDING DISK AND DISK DRIVE WITH AMPLITUDE-TYPE SERVO FIELDS HAVING PATTERNED ALTERNATING-POLARITY SERVO ISLANDS FOR READ/WRITE HEAD POSITIONING."

BACKGROUND OF THE INVENTION

1. Field of the Invention

This invention relates generally to patterned-media magnetic recording disks, wherein each data bit is stored in a magnetically isolated data island on the disk, and more particularly to a patterned-media disk and disk drive with patterned nondata servo fields for head-positioning.

2. Description of the Related Art

Magnetic recording hard disk drives with patterned magnetic recording media have been proposed to increase the data density. In patterned media, the magnetic recording layer on the disk is patterned into small isolated data islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple magnetic domains separated by domain walls. To produce the required magnetic isolation of the patterned islands, the magnetic moment of the spaces between the islands must be destroyed or substantially reduced so as to render these spaces essentially nonmagnetic. Alternatively, the patterned media may be fabricated so that that there is no magnetic material in the spaces between the islands. U.S. Pat. Nos. 5,820,769; 5,587,223; and 6,383,598 are representative of various types of patterned media and their methods of fabrication.

Like conventional non-patterned or continuous-media disks, patterned-media disks also have nondata servo regions that are used for read/write head positioning. The nondata servo regions in patterned-media disks contain servo islands or blocks separated by nonmagnetic spaces. The servo blocks are patterned into a position error signal (PES) field that generates a servo readback signal that is demodulated into a PES for positioning the read/write head to the desired data track and maintaining it on track. The proposed pattern of servo blocks and demodulation technique is the conventional amplitude-type quadrature servo pattern that uses four spaced-apart PES fields A-D.

What is needed is a patterned-media magnetic recording disk with servo blocks patterned into a PES field that requires less disk space than the conventional amplitude-type quadrature servo pattern, and a disk drive with a demodulation technique for the servo pattern.

SUMMARY OF THE INVENTION

The invention relates to a magnetic recording disk drive and disk, with the disk having pre-patterned nondata servo sectors extending generally radially across the data tracks. The servo sectors include a synchronization pattern of generally radially directed magnetized marks, a first position error signal (PES) field of generally radially directed magnetized stripes, and a second PES field of generally radially directed magnetized stripes. Each stripe in each of the two fields comprises a plurality of radially spaced discrete servo islands, each island having a radial height of approximately Tp, where Tp is the spacing of the track centerlines in the radial direction. In each field, the servo islands in alternating stripes in the along-the-track direction are shifted radially by approximately Tp.

In the first PES field, the islands are centered at the midline between two adjacent track centerlines, and in the second PES field the islands are centered at the track centerlines. All of the servo islands in the two PES fields have the same magnetization direction, and the marks in the synchronization pattern also have the same magnetization direction, which is preferably the same as that of the servo islands.

The disk may be a patterned-media disk with both pre-patterned data islands and pre-patterned nondata servo sectors, a continuous-media disk with conventional continuous-media data tracks and pre-patterned nondata servo sectors, or a continuous-media disk with discrete data tracks and pre-patterned nondata servo sectors.

The disk drive includes servo electronics that includes a finite impulse response (FIR) filter for generating a signal representing the moving average of the servo signal from the two PES fields. The servo electronics calculates the amplitude of the servo signal from the synchronization pattern, and the amplitudes and phases of the moving average signal from the two PES fields. From these calculated values a main position error signal (mPES) and a substitute position error signal (sPES) are calculated, with the mPES representing the read head offset from the track centerline and the sPES representing the read head offset from the midpoint of two track centerlines. The PES is calculated using one or the other of the mPES and sPES.

For a fuller understanding of the nature and advantages of the present invention, reference should be made to the following detailed description taken together with the accompanying figures.

DETAILED DESCRIPTION OF THE INVENTION

Figure 1A:
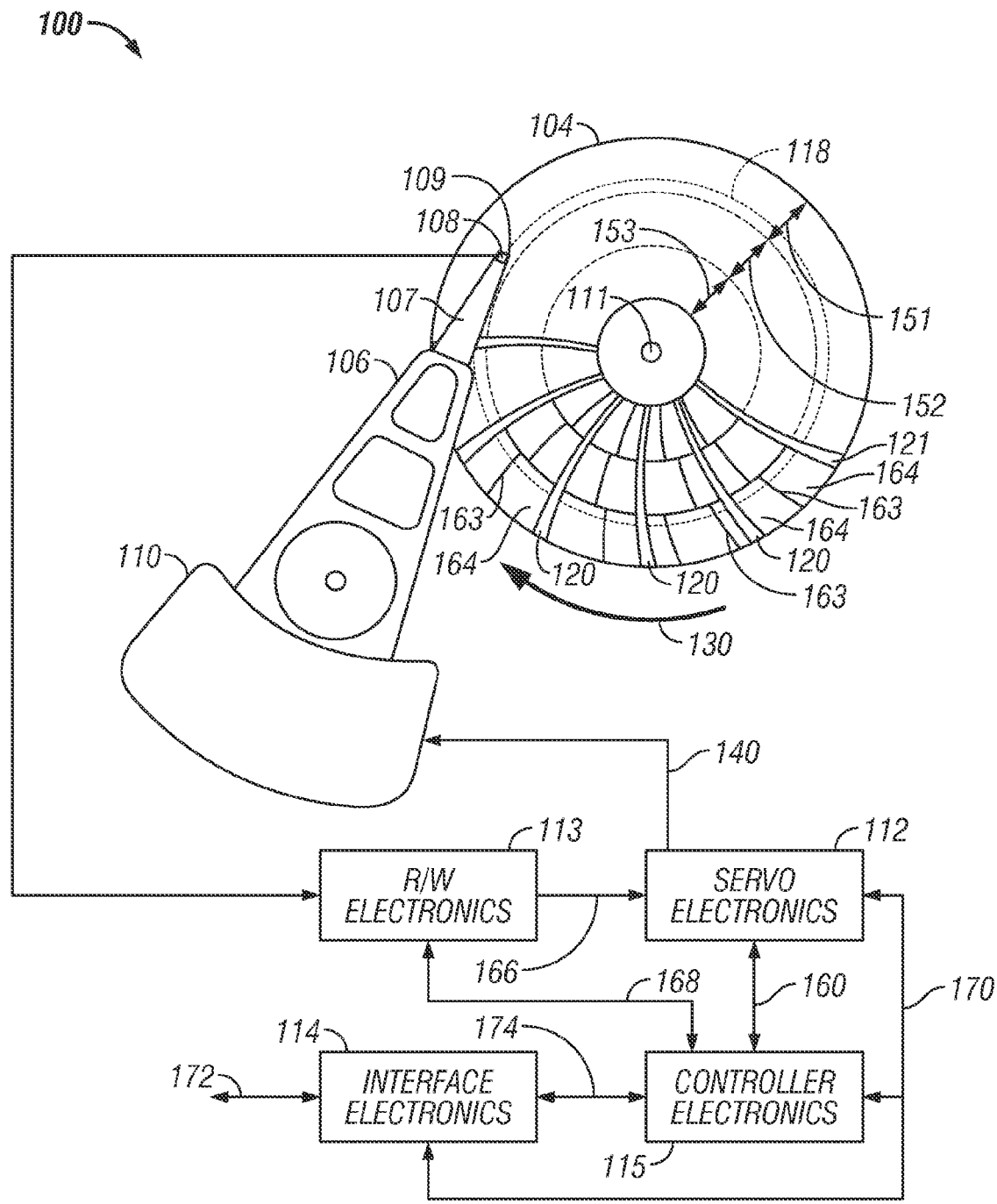
FIG. 1 is a schematic of a conventional magnetic recording disk drive illustrating the magnetic recording disk with nondata servo sectors and synchronization fields.

FIG. 1 is a schematic of a conventional magnetic recording disk drive and illustrates the magnetic recording disk with the nondata regions, specifically the servo sectors for positioning the recording heads on the data tracks and the synchronization fields for enabling the recording heads to read and write data in the data sectors. The disk drive, designated generally as 100, includes the magnetic recording disk 104, a radial voice coil motor (VCM) actuator 110, an actuator arm 106, a suspension 107, a head carrier or air-bearing slider 108 and a recording head 109. The recording head 109 is typically a combination of an inductive write head with a magnetoresistive read head (also called a read/write head) and is located on the trailing end or end face of slider 108. Slider 108 is supported on the actuator arm 106 by a suspension 107 that enables the slider to "pitch" and "roll" on an air-bearing generated by the disk 104 as it rotates in the direction of arrow 130. Only one disk surface with associated slider and recording head is shown in FIG. 1, but there are typically multiple disks stacked on a hub that is rotated by a spindle motor, with a separate slider and recording head associated with each surface of each disk.

Figure 2:
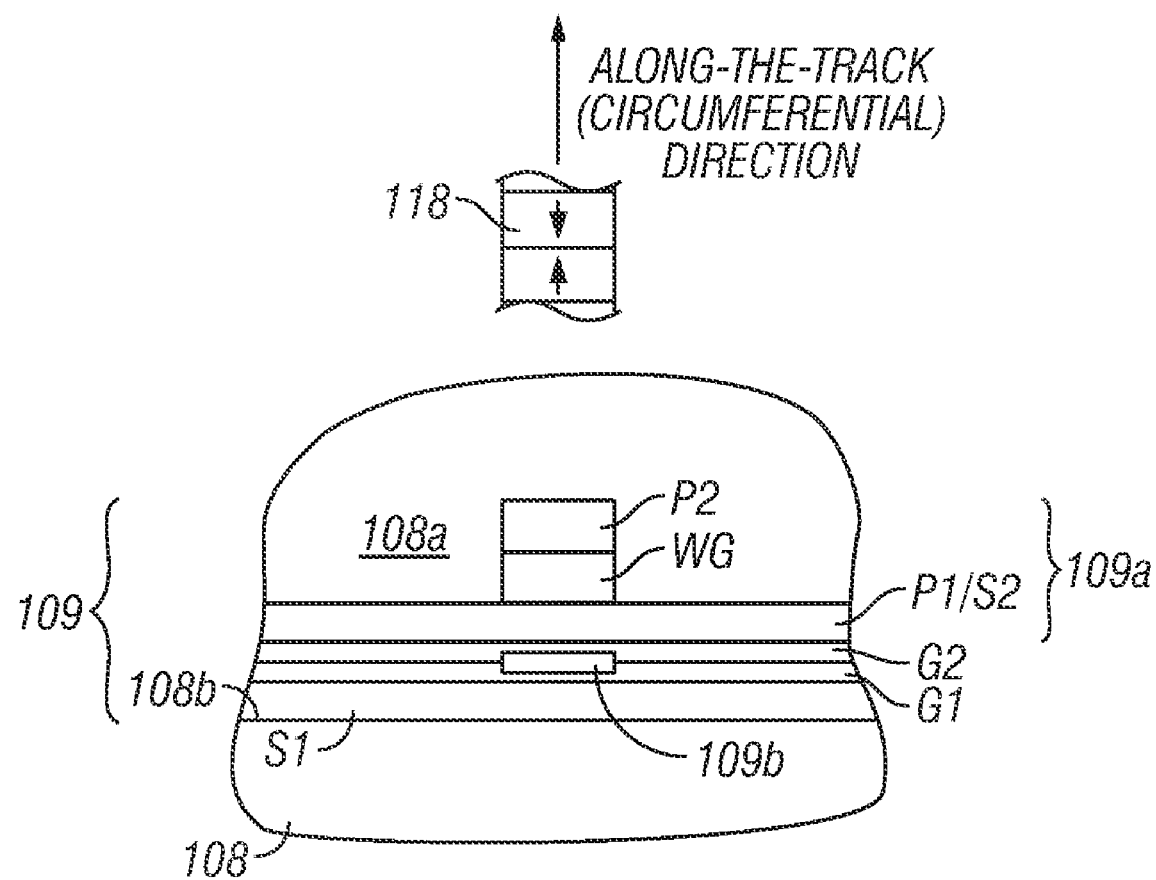
FIG. 2 is a view showing the disk-facing surface of the disk-drive slider with the ends of the read/write head and a portion of a data track as viewed from the surface of the disk.

FIG. 2 is a view showing the disk-facing surface 108a of slider 108 and the ends of head 109 as viewed from the surface of disk 104 superimposed with a portion of data track 118. The head 109 is a read/write head and is a series of thin films deposited and lithographically patterned on the end face 108b of slider 108. The write head 109a includes magnetic write poles P1/S2 and P1 separated by a write gap WG. When write current is directed to the write head 109a a magnetic field is generated across WG in a direction along the data track 118. The magnetoresistive sensor or read head 109b is located between two insulating gap layers G1, G2. Gap layers G1, G2 are located between magnetic shields S1 and P1/S2, with P1/S2 also serving as the first write pole for the write head 109a. Because shield S2 also serves as the pole P1, this type of read/write head is known as a "merged" head. If S2 and P1 are separate layers the read/write head is known as a "piggyback" head. Because the films making up head 109 are deposited sequentially on end face 108b of slider 108, there is a spacing D in the along-the-track or circumferential direction between the read head 109b and the write gap WG of write head 109a. The write head 109a depicted in FIG. 2 is a horizontal-recording write head for recording magnetizations in the plane of the recording layer on disk 104, as shown by the arrows in the section of data track 118. However, the write head may also be a perpendicular-recording write head with a perpendicular write pole (WP) that records magnetizations perpendicular to the recording layer on disk 104.

Referring again to FIG. 1, the disk 104 has a center of rotation 111 and is rotated in direction 130. The disk 104 has a magnetic recording layer with radially-spaced concentric data tracks, one of which is shown as track 118. Each data track has a reference index 121 indicating the start-of-track. The disk drive is illustrated as a zone-bit-recording (ZBR) disk drive because the data tracks are grouped radially into a number of annular data bands or zones, three of which are shown as zones 151, 152 and 153, but the invention is fully applicable to a disk drive that does not use ZBR, in which case the disk drive would have only a single data zone. Within each zone, the tracks are also circumferentially divided into a number of data sectors, such as typical data sectors 164 in the radially outer data zone. Each data sector 164 is preceded by a synchronization (sync) field, such as typical sync fields 163. The sync fields 163 are detectable by the read head for enabling synchronization of reading and writing the data bits in the data sectors 164.

Each data track also includes a plurality of circumferentially or angularly-spaced servo sectors 120 that contain positioning information detectable by the read head for moving the head 109 to desired data tracks and maintaining the head 109 on the data tracks. The servo sectors in each track are aligned circumferentially with the servo sectors in the other tracks so that they extend across the tracks in a generally radial direction, as represented by generally radially-directed servo sectors 120. The servo sectors 120 have a generally arcuate shape in the generally radial direction that generally replicates the path of the head 109 as it is moved across the disk by the radial actuator 110. The servo sectors 120 are nondata regions on the disk that are magnetized once, typically during manufacturing or formatting of the disk, and are not intended to be erased during normal operation of the disk drive.

The electronics associated with disk drive 100 include read/write (R/W) electronics 113, servo electronics 112, controller electronics 115 and interface electronics 114. In the operation of disk drive 100, the R/W electronics 113 receives signals from head 109 and passes servo information from the servo sectors 120 to servo electronics 112 and data signals from the data sectors 164 to controller electronics 115. Servo electronics 112 uses the servo information to produce a current at 140 that drives VCM actuator 110 to position head 109. Interface electronics 114 communicates with a host system (not shown) over interface 172, passing data and command information. Interface electronics 114 also communicates with controller electronics 115 over interface 174. In the operation of disk drive 100, interface electronics 114 receives a request for reading from or writing to the data sectors 164 over interface 172. Controller electronics 115 receives a list of requested data sectors from interface electronics 114 and converts them into a set of numbers that uniquely identify the disk surface, track and data sector. The numbers are passed to servo electronics 112 to enable positioning head 109 to the appropriate data sector.

If the disk drive is a "headerless" architecture disk drive, meaning that the data sectors 164 do not contain unique data sector addresses that are required to be read before data can be read from or written to the data sectors, then once the servo electronics 112 has positioned head 109 over the appropriate data track, servo electronics 112 begins executing sector computations to locate and identify the desired data sector. In brief, in the headerless architecture approach, a servo timing mark (STM) at the beginning of the servo sectors 120 is used to locate servo sectors, and a count of STMs from a servo sector containing an index mark 121 uniquely identifies each servo sector. Once the desired data sector is thus identified, the sync field preceding that data sector is detected to control the timing of data bits read from the data sector or data bits written to the data sector.

Conventional magnetic recording disk drives use disks with "continuous" media, meaning that the magnetic recording layer is a continuous film of magnetizable material. In conventional continuous-media disks the concentric data tracks are not physically separated from one another and are not pre-formed in the recording layer, but are formed when the write fields from the write head create the magnetizations in the continuous magnetic layer. A continuous-media disk may also be a "discrete-track" disk, meaning that the concentric data tracks of continuous magnetic material are radially separated from one another by concentric nonmagnetic guard bands. Discrete-track magnetic recording disks are known in the art, as described for example in U.S. Pat. No. 4,912,585. In a discrete-track disk, the nonmagnetic guard bands may be trenches or grooves, or formed of nonmagnetic material, or contain magnetic material but have surfaces far enough below the surfaces of the data tracks to not adversely the readback signals from the data tracks.

Magnetic recording disks with "patterned" media have been proposed to increase the data density. In patterned media, the magnetizable material on the disk is patterned into small isolated islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple magnetic domains separated by domain walls. To produce the required magnetic isolation of the patterned islands, the magnetic moment of the spaces between the islands must be destroyed or substantially reduced so as to render these spaces essentially nonmagnetic. In patterned media, the data sectors as well as the nondata regions are patterned. However, it is also possible to fabricate a continuous-media disk wherein just the nondata regions are patterned. This type of continuous-media disk may have either conventional concentric data tracks, or discrete data tracks separated by nonmagnetic guard bands, but the nondata regions are patterned. An example of a discrete-track disk with patterned servo regions is described in U.S. Pat. No. 4,912,585.

Figure 3:
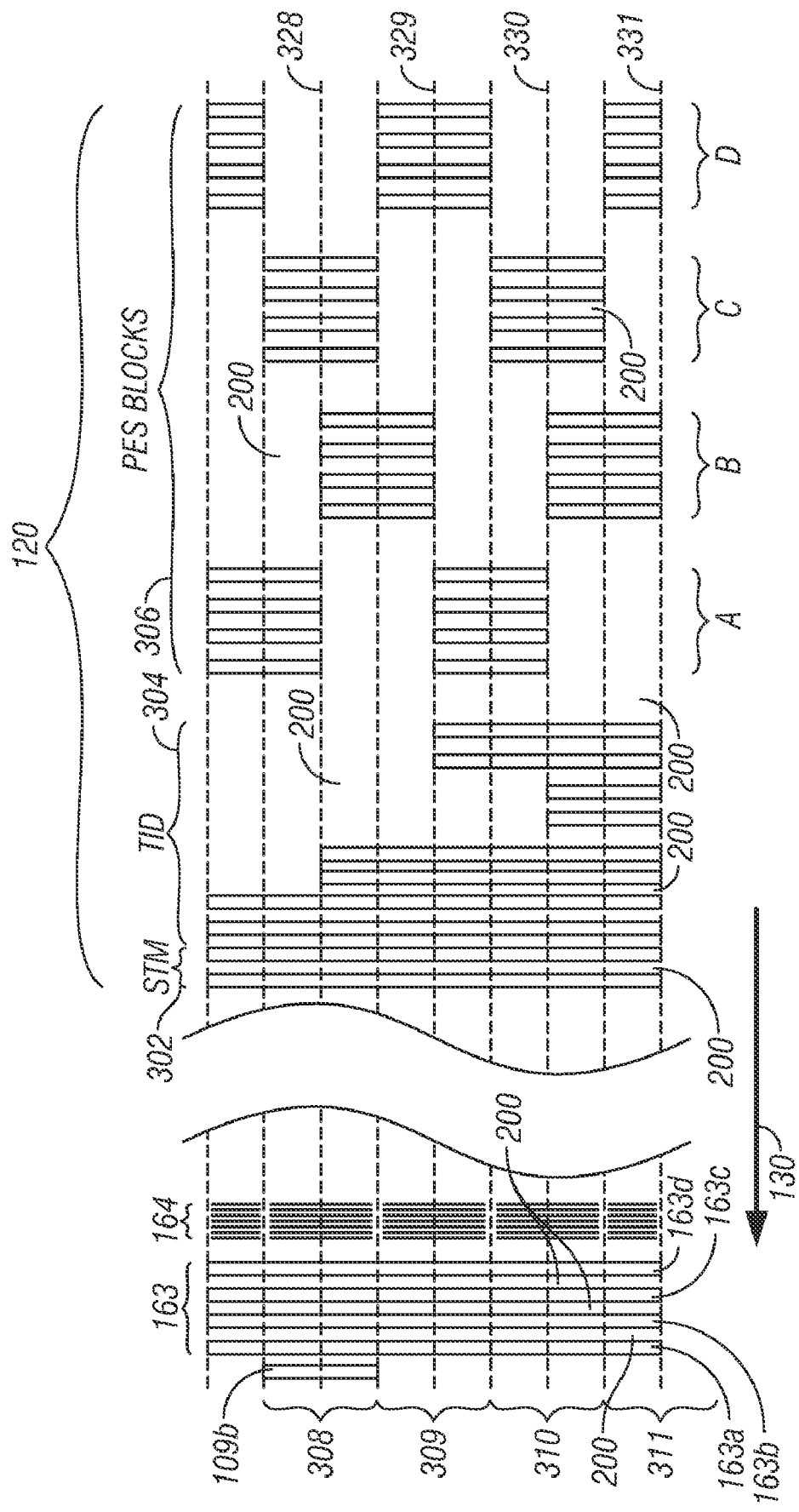
FIG. 3 is a schematic showing a portion of a patterned-media disk with a patterned sync field and a patterned servo sector spanning several data tracks, as proposed in the prior art.

FIG. 3 is a schematic showing a portion of a patterned-media disk with a patterned sync field 163 and a patterned servo sector 120 spanning several data tracks, as proposed in the prior art. Four full data tracks are depicted: 308, 309, 310 and half-track 311, each having a respective track centerline 328, 329, 330 and 331. The read head 109b is shown as positioned in data track 308 and will detect the islands in sync field 163 and servo sector 120 as the disk rotates in the direction of arrow 130.

The sync field 163 is depicted with four sync marks as magnetized nondata islands 163a-163d separated by nonmagnetic spaces. The sync marks are stripes that extend across the data tracks in the radial direction, resulting in a single-frequency pattern suitable for locking a phase-locked-loop data clock prior to reading or writing data bits in the data sectors. The sync field 163 precedes the data sector 164, which shows several data islands, represented as solid lines.

The servo sector 120 is a conventional servo pattern of the type commonly used in sector servo systems and shows a greatly simplified pattern for clarity. The servo pattern includes several fields containing nondata islands, three of which are shown as servo-timing-mark (STM) field 302, track ID (TID) field 304 and position-error-signal (PES) field 306 depicted as the well-known quadrature pattern of four PES fields comprising groups of islands A-D. The PES islands in groups A-D are used to determine the fractional part of the radial position of the head. When the head is at the track centers the read-back signal amplitudes from the group A islands and the group B islands are equal. When the head is at the half-track positions the amplitudes from the group C islands and the group D islands are equal. As the head moves off-track the amplitudes from all the islands will increase or decrease. The amplitudes of the PES islands are decoded in servo electronics 112 and used to reposition the head.

In FIG. 3 all of the islands in sync field 163, data sector 164 and servo sector 120 are discrete islands of magnetic material and are magnetized in the same direction, either perpendicular to the recording layer (either into or out of the paper in FIG. 3) for perpendicular-recording media, or in the plane of the recording layer (either to the right or left in the along-the-track direction in FIG. 3) for horizontal-recording media. The islands are typically DC-magnetized by a large magnet during manufacturing. Each discrete island is a magnetized island separated from other islands by nonmagnetic spaces represented as 200. The term "nonmagnetic" means that the spaces 200 between the islands are formed of a nonferromagnetic material, such as a dielectric, or a material that has no substantial remanent moment in the absence of an applied magnetic field, or a magnetic material in a groove or trench recessed far enough below the islands to not adversely affect reading or writing. The nonmagnetic spaces 200 may also be the absence of magnetic material, such as grooves or troughs in the magnetic recording layer or disk substrate.

As shown schematically in FIG. 3, the nondata islands (sync field 163 and servo sector 120) have a frequency substantially lower than the data islands (data sector 164). This is because for a given resolution of the read head 109b, a modern partial-response (PR) read channel in R/W electronics 113 can handle linear bit densities with a period several times greater than the resolution of the read head. However, to clearly resolve individual pulses, which is beneficial for data synchronization and PES decoding, the period of the nondata islands should be close to the resolution of the read head.

This invention relates to a disk and disk drive with a servo pattern comprising patterned nondata islands, but in which a synchronization field or pattern is used together with an improved and shortened amplitude-type PES field to generate the PES. The disk may be a patterned-media disk with both pre-patterned data islands and pre-patterned nondata islands, a continuous-media disk with conventional continuous-media data tracks and pre-patterned nondata islands, or a continuous-media disk with discrete data tracks and pre-patterned nondata islands.

Figure 4:
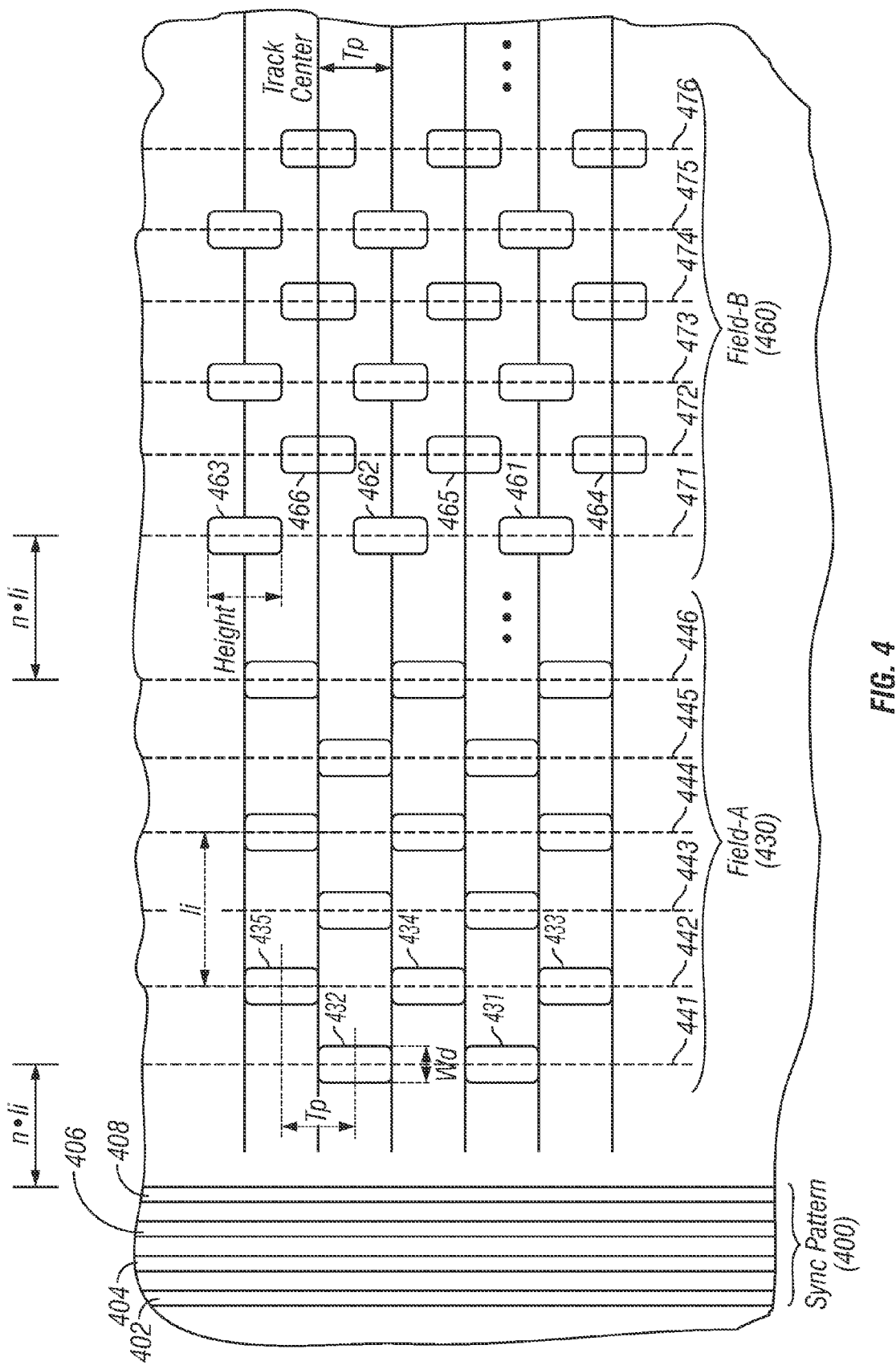
FIG. 4 is an illustration of the position error signal (PES) field according to the present invention with the synchronization pattern and PES bursts or fields A and B with rectangularly shaped islands.

In this invention, a portion of the servo sector is shown in FIG. 4 and includes synchronization (or "sync") field or pattern 400 (like item 163 in FIG. 3) and two PES fields identified as Field-A (item 430) and Field-B (item 460). The term "synchronization pattern" is used for convenience herein and is not meant to imply that the radial "synchronization marks" are the same ones used for synchronizing the head for reading and writing of data (like item 163 in FIG. 3). Any pattern with the required circumferential interval between the radial marks will function with this demodulation method that uses only the two fields A and B. The elimination of two of the PES fields (e.g., Fields C and D in FIG. 3) reduces the amount of disk space needed for servo information, thus increasing the amount of disk space available for data.

The pattern of PES fields identified as Field-A (item 430) and Field-B (item 460) in FIG. 4 is substantially similar to the pattern described in the previously-cited related application Ser. No. 11/840,900. However, in that application the servo islands have alternating polarity of magnetization in the along-the-track direction, i.e., alternate radial stripes in the PES fields have a magnetization direction antiparallel to the magnetization direction of the other stripes in the PES fields, and a different demodulation technique is required. A patterned-media disk with servo islands having alternating polarity in the along-the-track direction and patterned into four separate PES fields A-D so as to form a conventional amplitude-type quadrature servo pattern is described in pending application Ser. No. 11/148,918, published as US2006/0280975 A1 and assigned to the same assignee as this application.

In FIG. 4 each horizontal line represents a single track centerline. The sync pattern 400 includes magnetized radial marks 402, 404, 406, 408 separated by nonmagnetic spaces. Field-A 430 is shown with six generally radially directed stripes 441, 442, 443, 444, 445 and 446, with each stripe having discrete radially spaced-apart magnetized islands, like representative islands 431, 432 in stripe 441 and islands 433, 434, 435 in stripe 442. The islands in alternating stripes in each PES field are shifted radially by approximately the track pitch (Tp), as can be seen by comparing the radial location of the islands in stripes 441, 443, 445 with the islands in stripes 442, 444, 446 in Field-A 430. The pattern of Field-B 460 is identical to the pattern of Field-A 430 with the exception that all the islands are shifted radially by one-half the track pitch (Tp), which is equal to the track width and the radial spacing between adjacent track centerlines. Thus Field-B 460 is shown with six generally radially directed stripes 471, 472, 473, 474, 475 and 476, with each stripe having discrete islands, like representative islands 461, 462, 463 in stripe 471 and islands 464, 465, 466 in stripe 472. In Field-A, each of the islands is centered at a midline halfway between two adjacent track centerlines, while in Field-B, each of the islands is centered on a track centerline.

The marks in sync pattern 400 and the stripes in Field-A 430 and Field-B 460 extend in the generally radial direction across the disk and preferably have an arcuate shape that generally replicates the path of the head as it is moved across the disk by the radial actuator (as shown by servo sectors 120 in FIG. 1A). The spaces between the sync marks, the stripes and the islands are nonmagnetic spaces. All the islands in Field-A and Field-B have the same direction of magnetization, i.e., they are all pre-magnetized with the same polarity. Also, all the marks in sync pattern 400 have the same direction of magnetization, and are preferably magnetized in the same direction as the islands in Field-A and Field-B.

Figure 5:
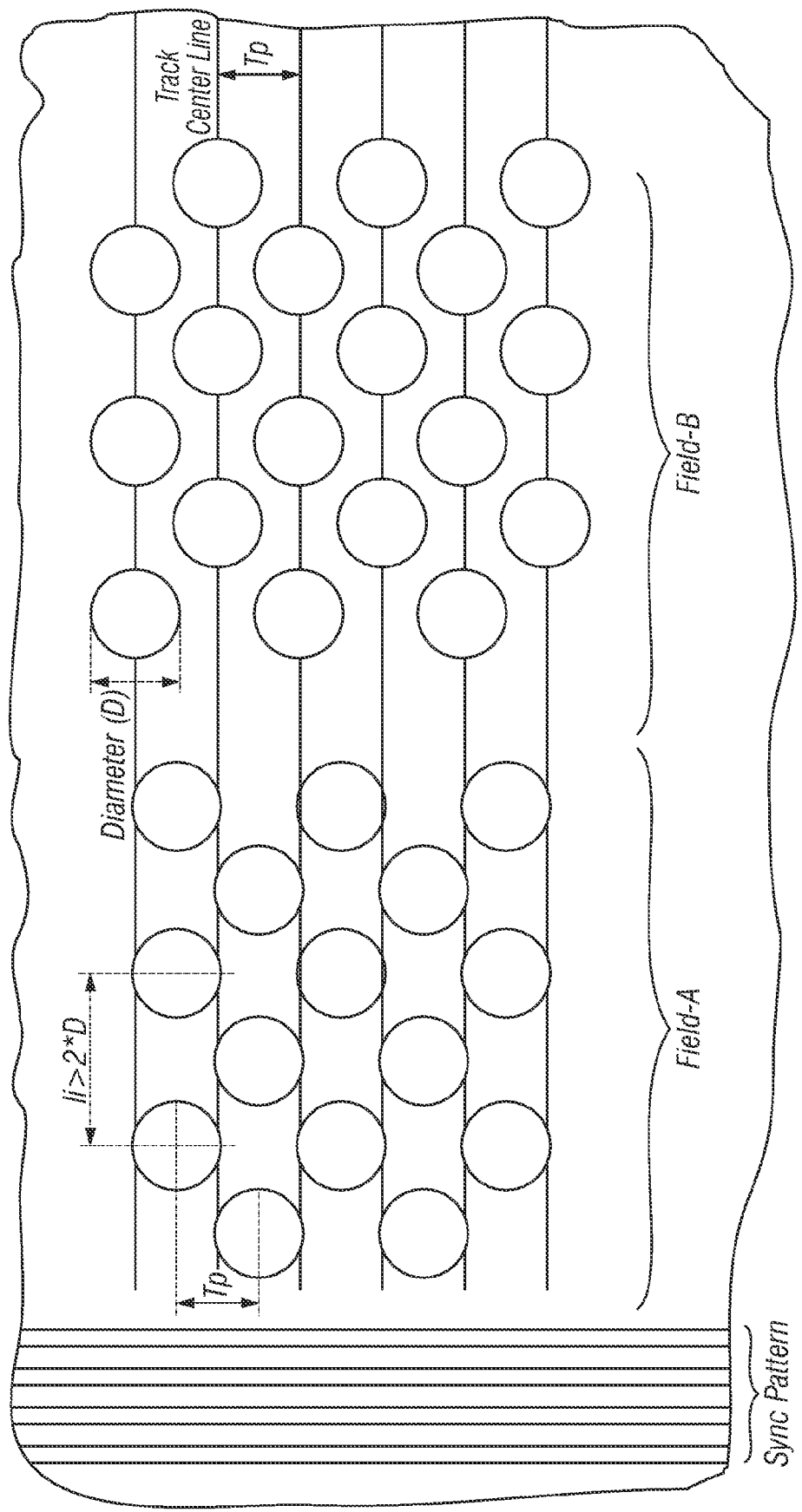
FIG. 5 is an illustration of the position error signal (PES) field according to the present invention with the synchronization pattern and PES bursts or fields A and B with circularly shaped islands.

The island shape in FIG. 4 is generally that of a rectangle, with slightly rounded corners as a result of the fabrication process. However, the islands can have a shape other than a rectangle. Also in FIG. 4, the island height in the radial direction is shown as being approximately equal to Tp. However, the island radial height can be slightly greater or less than Tp. FIG. 5 shows an example of a portion of a servo sector with the sync pattern and Fields A and B, where the island shape is generally that of a circle and the island height (the circle diameter) is slightly greater than Tp. In FIGS. 4 and 5, there are six stripes in each Field-A and Field-B. The number of stripes depends on the how much noise the pattern's read back signal has. If there are more stripes in each field, the readback signal can be averaged based on more sampling data, which increases the cancelation of noise. The circumferential interval "Ii" between islands is the same at one radial location, and this interval is proportional to the radial distance "r" from the center of the disk. This means essentially that the radial stripes in Field-A and Field-B, as well as the sync marks in sync pattern, are generally equally angularly spaced apart. This results in generally a constant frequency for the servo readback signal across the entire disk (or data zone if the disk has multiple annular data bands or zones). The pattern dimension depends on the design track pitch Tp and the read head geometry and characteristics. In the examples of FIGS. 4 and 5, Tp is 39 nm, and the island interval Ii at this particular radial location is 100 nm. The island width (Wd) in the circumferential be less than one-half the island circumferential interval (Ii). A simulation has demonstrated that Wd=¼*Ii produces good results.

As shown in FIG. 4, the sync marks and alternate stripes in each field are placed at the circumferential interval Ii. The interval between circumferentially adjacent stripes in each field is thus ½*Ii. The interval between the last sync mark 408 and the first stripe 441at the boundary between the sync pattern 400 and Field-A is defined as n*Ii. Similarly, the interval between the last stripe 446 in Field-A and the first stripe 471 in Field-B is also defined as n*Ii. The multiple "n" is an integer and is preferably 1. The circumferential boundary interval n*Ii is also proportional to the pattern's radial distance "r" from the center of the disk.

PES demodulation includes an amplitude measurement method to determine the magnitude of the PES, and a phase measurement method to determine the sign of the PES. The Field-A pattern is used for creating the "mPES" (main position error signal), which is proportional to the read head offset from the track centerline. The Field-B pattern is used for creating the "sPES" (substitute position error signal), which is proportional to the read head offset from the midpoint of two adjacent tracks. By using mPES and sPES, the position error signal can cover the read head offset in the entire track width.

The mPES and sPES are given by the following equations:

$$\text{mPES} = A\_sign * gain\_h * (\text{Amp}\_A)/(\text{Amp}\_\text{Sync}) \quad \text{Equation (1)}$$

$$\text{sPES} = B\_sign * gain\_h * (\text{Amp}\_B)/(\text{Amp}\_\text{Sync}) \quad \text{Equation (2)}$$

Figure 6:
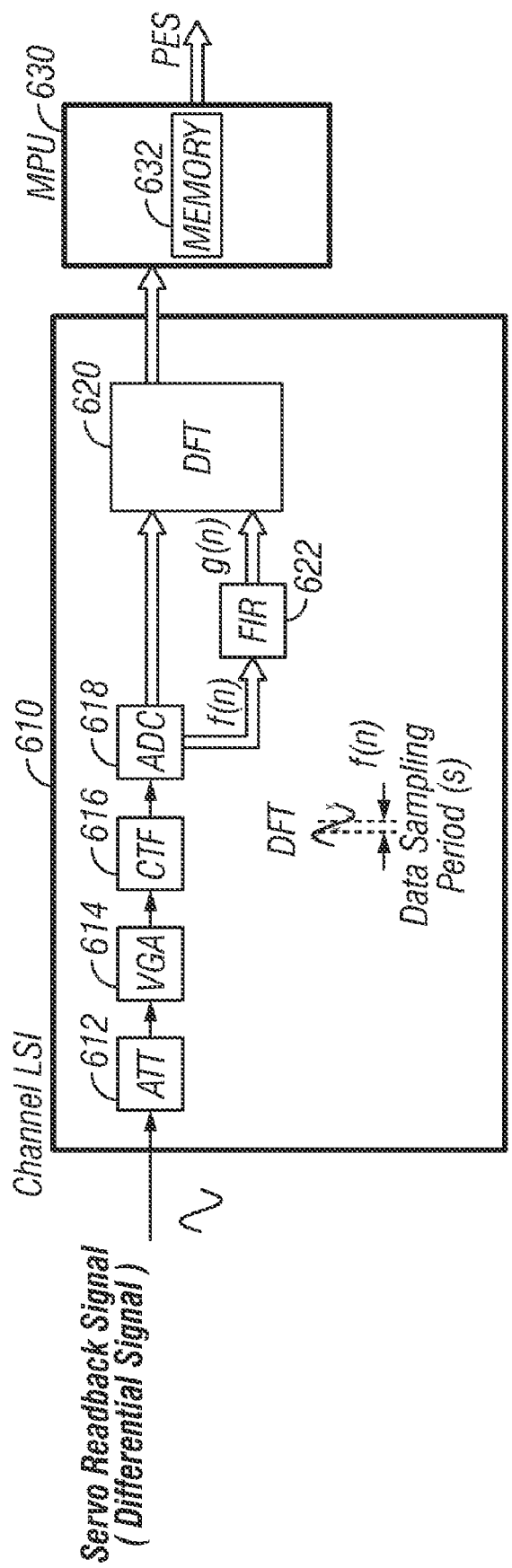
FIG. 6 is a block diagram of the hardware for demodulating the servo readback signal into the PES.

In Equations (1) and (2) "gain_h" is a slope correction factor. "Amp_A" and "Amp_B" are the output amplitudes for Field-A and Field-B, respectively, from a finite impulse response (FIR) digital filter (FIG. 6). "A_sign" and "B_sign" are positive or negative signs depending on the phase relationship between the FIR filter output signals from the two fields. "Amp_Sync" is the amplitude of the readback signal at the primary frequency of the sync pattern. "Amp_Sync" is the AC component of the primary frequency of the readback signal from the sync pattern. It is used to normalize the PES value so that the PES value is stable even if the sensitivity of the read head changes. In actual implementation, the readback signal is sampled at a rate of some integer multiple of the readback signal frequency. The primary frequency of the readback signal is usually measured by a Discrete Fourier Transform (DFT) calculation.

The "gain_h" slope correction factor allows the demodulated mPES and sPES to be connected smoothly as a straight line for the entire track width. The value of "gain_h" depends primarily on "Ii" and the size and shape of the islands. To cover the entire disk, "gain_h" is calibrated for different pattern radial locations for some range of tracks, e.g., every 10,000 tracks. This "gain_h" calibration is very similar to the calibration for the conventional quadrature burst amplitude pattern. The demodulated PES is proportional to radial movement of the read head, and this relationship is close to linear. By applying the slope correction "gain_h", the demodulated mPES and sPES can be connected smoothly as a line across the entire track width.

FIG. 6 shows one example of the hardware for demodulation of the servo readback signal into the PES. The demodulation operation outputs the PES, which is a value proportional to the read head radial distance from the track centerline. The demodulation method includes amplitude measurement of the Sync Pattern 400 (FIG. 4), amplitude and phase measurements from the burst patterns of Field-A 430 and Field-B 460 (FIG. 4), calculation of mPES and sPES from Equations (1) and (2), and final calculation of the PES. The demodulation is based on digital sampling and filtering and Discrete Fourier Transform (DFT) calculations. In this example, data sampling, the DFT function, and the amplitude averaging is performed in the data channel large-scale read/write channel integrated circuit chip (LSI) 610, corresponding generally to the R/W electronics block 113 (FIG. 1A), and mPES, sPES and final PES calculations are performed in the microprocessor (MPU) 630, corresponding generally to servo electronics 112 and controller electronics 115 (FIG. 1A). However, all of the calculations may be performed by a single digital signal processor (DSP) or microprocessor with associated memory, like memory 632 associated with MPU 630, for storing computer program instructions for performing the calculations.

The servo readback signal goes to the channel LSI 610 and is input to the attenuator (ATT) 612. ATT 612 roughly adjusts the input signal amplitude in the adjustable signal range of the variable gain amplifier (VGA) 614. VGA 614 then adjusts the input signal amplitude in some predefined amplitude range. The continuous time filter (CTF) 616 is a low-pass filter that band limits higher-frequency noise prior to sampling. Then the signals are sampled at the constant sampling rate, and converted to digital by analog-to-digital converter (ADC) 618. The digitized readback signal f(n) goes to the DFT block 620 and the FIR filter 622. FIR filter 622 calculates g(n), which represents the moving average of the input signal f(n). The FIR filter output g(n) also goes to DFT block 620. This specific DFT block 620 calculates the input signal's predefined primary frequency (F1) sine and cosine components. The amplitude can then be calculated as a square mean of the sine and cosine components, and the phase can be calculated as the arctangent of the ratio of the sine component to the cosine component. These DFT operations are commonly known. The DFT block 620 is time-shared to calculate both f(n) and g(n). Thus the f(n) input signal is used by DFT circuit 620 to calculate the sync pattern amplitude (Amp_Sync), and the g(n) input signal from FIR filter 622 is used to calculate the amplitude and phase of the burst patterns from Field-A and Field-B. The calculation results are transferred to the MPU 630 and mPES and sPES are calculated in the MPU 630 in this example configuration.

Figure 7:
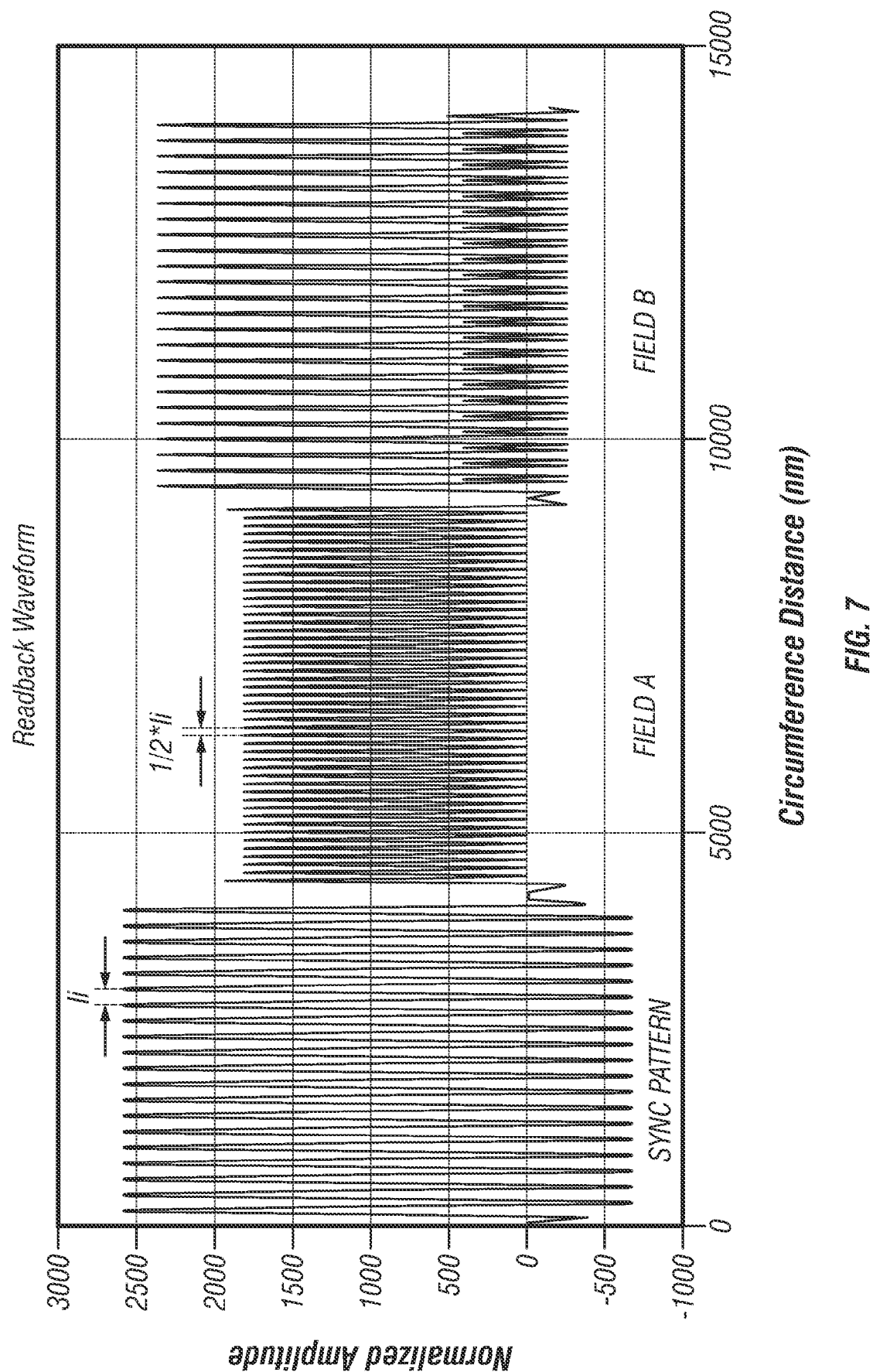
FIG. 7 is an example of the readback signal from the sync pattern, Field-A, and Field-B.

The DFT calculation is performed for the sampled digital data at DFT block 620 to calculate the primary frequency F1. This is given by the following:

$$F1 = \left(\frac{1}{N}\right)\sum_{n=0}^{N-1} f(n)\cos\left(\frac{2\pi n}{N}\right) - j\left(\frac{1}{N}\right)\sum_{n=0}^{N-1} f(n)\sin\left(\frac{2\pi n}{N}\right) \quad \text{Equation (3)}$$

where
j: imaginary unit
f(n): sampled readback signal
N: number of samples per cycle of the sync pattern readback signal FIG. 7 shows an example of the readback waveform from the sync pattern, Field-A, and Field-B before sampling. For this FIG. 7 and other figures that illustrate the readback signal, the servo pattern has 48 stripes per field, the islands have a rectangular shape with a radial height of 65 nm and a circumferential width of ¼*Ii, Tp=40 nm, Ii=200 nm. As FIG. 7 shows, the burst pattern frequency (Field-A and Field-B) is twice the sync pattern frequency as a result of the difference in the spacing of the sync marks (Ii) and the islands in the PES fields (½*Ii).

Figure 8:
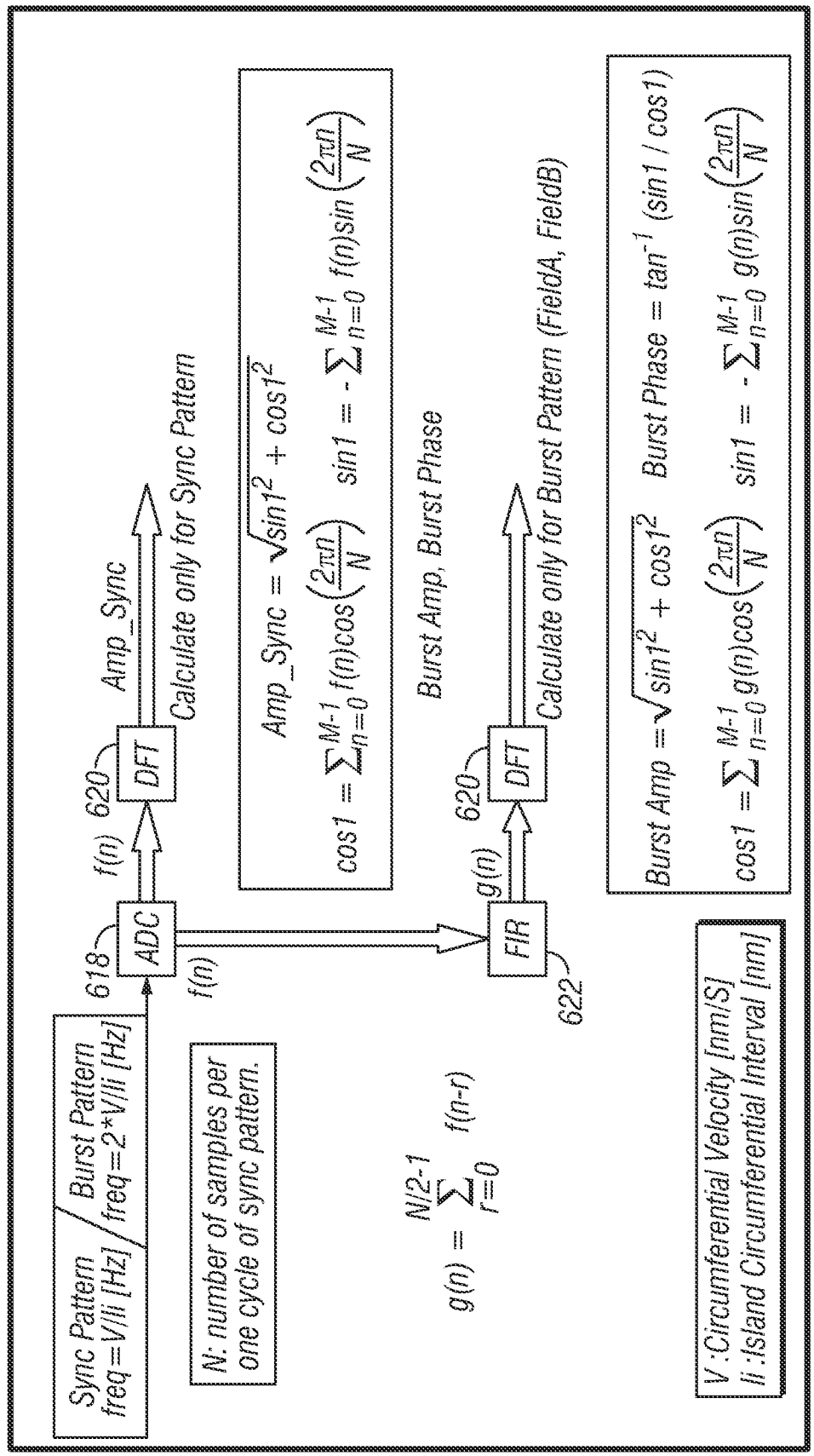
FIG. 8 is a more detailed block diagram of the demodulation hardware illustrating the finite impulse response (FIR) filter and Discrete Fourier Transform (DFT) block.

FIG. 8 shows a more detailed explanation of FIR filter 622 and the DFT calculation at block 620. The burst pattern frequency is 2*V/Ii [Hz] and is twice the sync pattern frequency of V/Ti [Hz], where "V" is the circumferential velocity [nm/sec] at the radius where the pattern is located, and "Ii" is the island circumferential interval [nm] at the same radius. The readback signals are sampled at the constant frequency, thus N samples per sync pattern cycle. The equation of FIR filter 622 is given as follows:

$$g(n) = \sum_{r=0}^{(\frac{N}{2})-1} f(n-r) \quad \text{Equation (4)}$$

FIR filter 622 calculates the moving average of the input signal f(n). The tap number is N/2, so the moving average is calculated once every one cycle of the burst pattern signal. For example, if N=16 and n=10 (the 10th sampling data), then g(10)=f(10)+f(9)+f(8)+f(7)+f(6)+f(5)+f(4)+f(3), which is the sum of the current and previous sampling data of f(n) in one cycle of burst signal. If g(10) is divided by 8, it becomes the average.

The sync pattern amplitude at the primary frequency F1 is calculated by DFT block 620 with input f(n). The sine and cosine components are as follows:

$$\cos 1 = \sum_{n=0}^{M-1} f(n)\cos\left(\frac{2\pi n}{N}\right) \quad \text{Equation (5)}$$

$$\sin 1 = -\sum_{n=0}^{M-1} f(n)\sin\left(\frac{2\pi n}{N}\right) \quad \text{Equation (6)}$$

The number M is the total sampling number, and is usually set to a multiple of N. By choosing a large number for M, the phase measurements can be averaged to reduce the noise. For example, if there are 6 stripes in each field, and N=16 data samples per one cycle of the readback signal, then M can be equal to (6/2)*16=48.

After calculating the sine and cosine components, the amplitude of the readback signal in the sync pattern can be calculated as follows:

$$\text{Amp\_Sync} = \sqrt{\sin 1^2 + \cos 1^2} \quad \text{Equation (7)}$$

The output g(n) from FIR filter 622 goes to DFT block 620 for the burst pattern readback signal amplitude and phase measurements at the primary frequency F1. In FIG. 8, there are two DFT blocks shown in parallel, but in an actual circuit implementation, the DFT block 620 can be one circuit and the functions can be time-shared. The burst pattern amplitude and phase at the primary frequency F1 are calculated by DFT block 620 with input g(n). The sine and cosine components for each of the burst pattern fields (Field-A and Field-B) are as follows:

$$\cos 1 = \sum_{n=0}^{M-1} g(n) \cos\left(\frac{2\pi n}{N}\right) \quad \text{Equation (8)}$$

$$\sin 1 = -\sum_{n=0}^{M-1} g(n) \sin\left(\frac{2\pi n}{N}\right) \quad \text{Equation (9)}$$

After calculating the sine and cosine components, the amplitude and phase of the readback signal in each of Field-A and Field-B can be calculated as follows:

$$\text{Amp} = \sqrt{\sin 1^2 + \cos 1^2} \quad \text{Equation (10)}$$

$$\text{Phase} = \tan^{-1}\left(\frac{\sin 1}{\cos 1}\right) \quad \text{Equation (11)}$$

Figure 9:
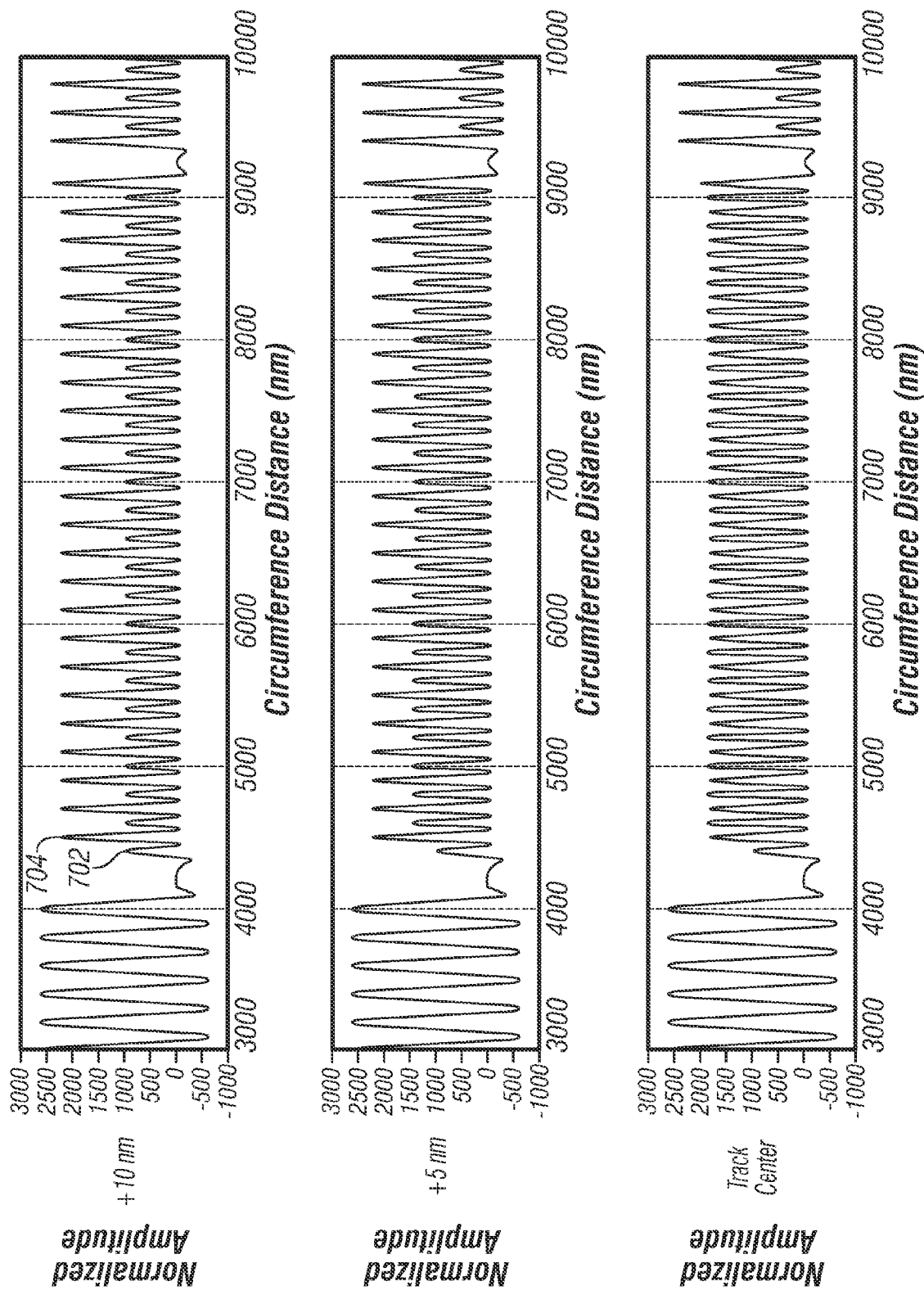
FIG. 9 shows the readback signal for part of the sync pattern, the entire Field-A, and part of Field-B, when the read head is at different radial positions ranging from −10 nm to +10 nm from the track centerline.
Figure 9:
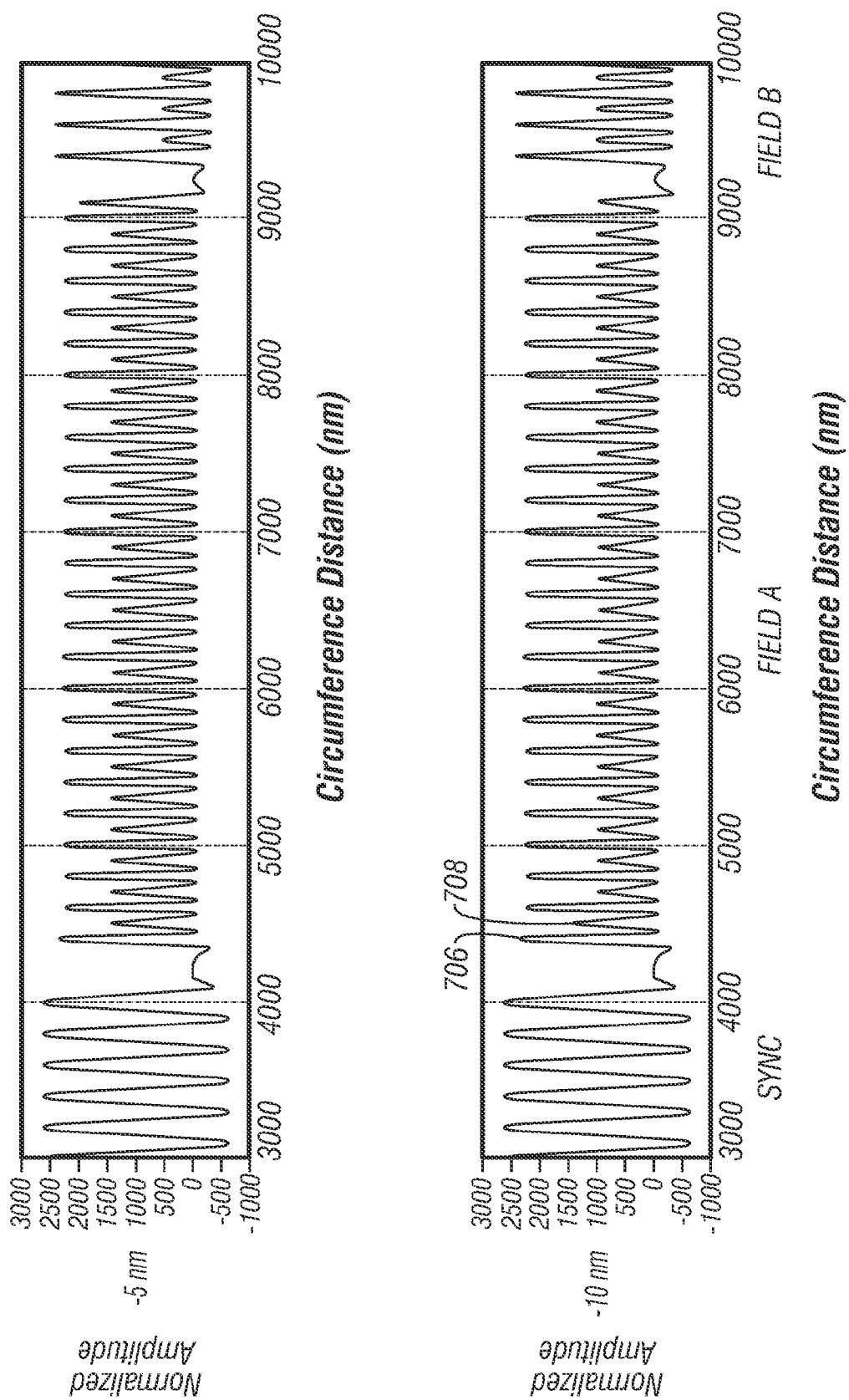

FIG. 9 shows the readback signal for part of the sync pattern, the entire Field-A, and part of Field-B, when the read head is at different radial positions ranging from −10 nm to +10 nm from the track centerline. When the read head is at the track centerline, the readback signal amplitude is uniform in over Field-A. If the read head is at some offset from the track centerline in the radial direction, the readback signal amplitude over Field-A changes at every alternate island. These signals correspond to the island location in the circumferential direction. The greater the offset from the track centerline, the greater the amplitude difference between two adjacent islands, as can by comparing the +5 nm offset with the +10 nm offset. The demodulation circuit described above is measuring this amplitude difference. Also, the order of signal amplitude change between two adjacent islands is opposite between plus and minus offset from the track centerline. This can be seen by comparing the signal at +10 nm radial offset, which shows small amplitude-large amplitude order (amplitude peaks 702, 704) with the signal at −10 nm radial offset, which shows large amplitude-small amplitude order (amplitude peaks 706, 708). This information can be used to identify the radial offset direction from the track centerline.

Figure 10:
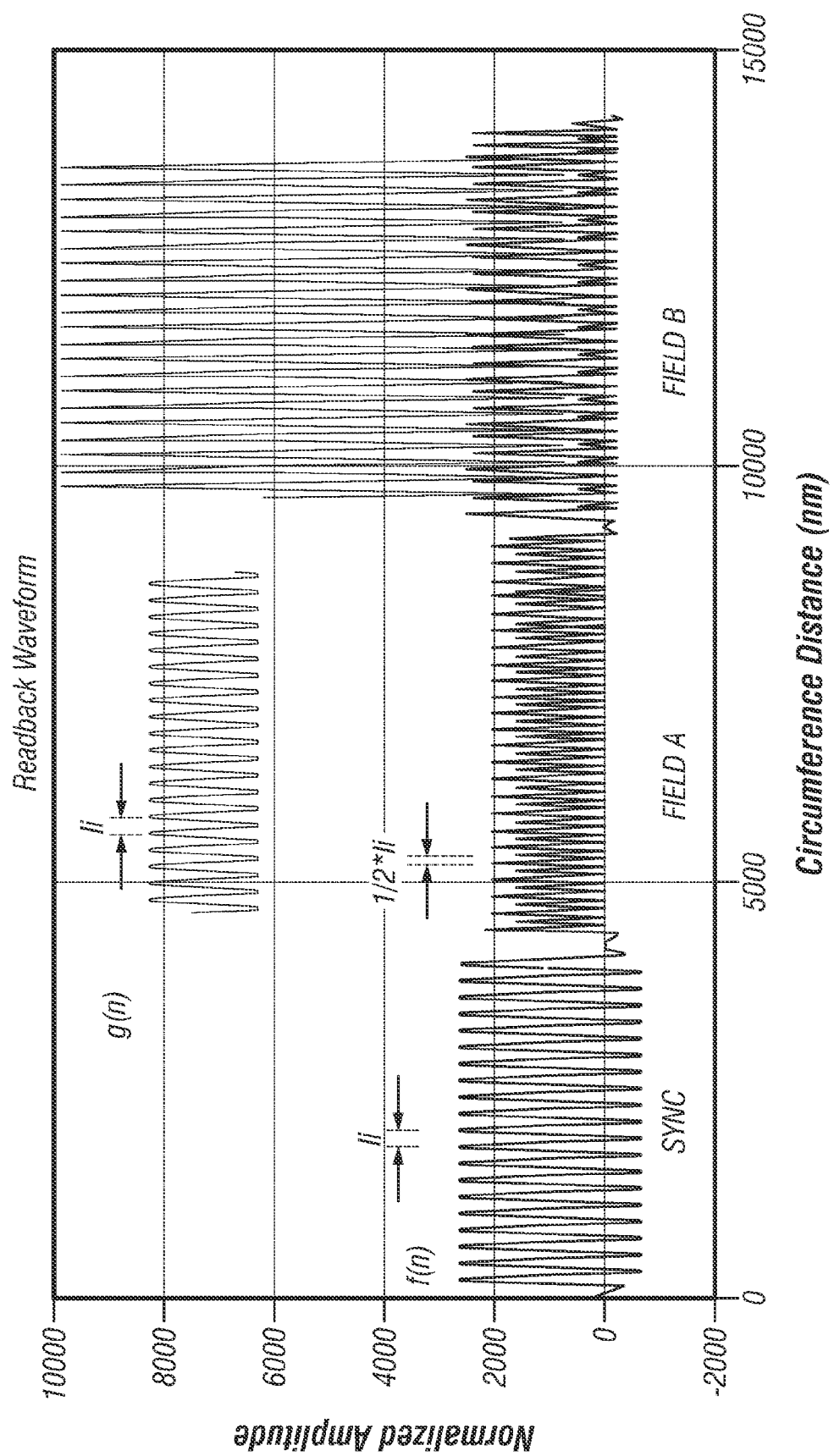
FIG. 10 shows the readback signal f(n) and FIR filter output g(n) when the read head is at +3 nm radial offset from the track centerline.

FIG. 10 shows an example of the sampled readback signal f(n) and FIR filter output g(n) when the read head is at +3 nm radial offset from the track centerline. The lower waveform is the sampled readback signal f(n) and the upper waveform is the FIR filter output g(n). The FIR filter generates g(n), which represents the moving average of the burst pattern readback signal f(n), and the amplitude difference between adjacent islands in each of Field-A and Field-B is expressed as the amplitude of FIR filter output signal g(n). Thus as shown in FIG. 10, the amplitude of g(n) over Field-B is larger than the amplitude of g(n) over Field-A because the amplitude difference of f(n) in Field-B is larger than the amplitude difference of f(n) in Field-A.

Figure 11:
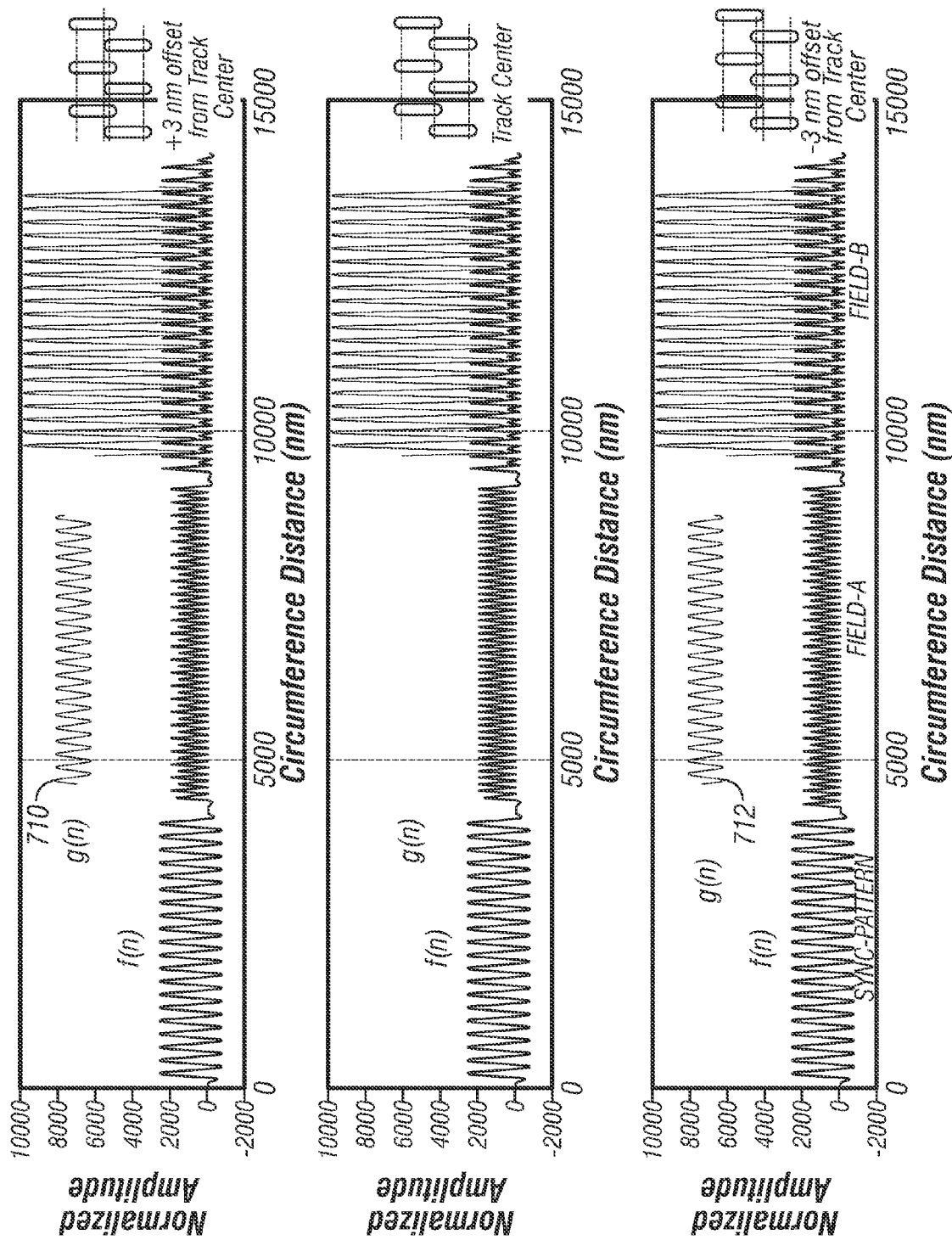
FIG. 11 shows a comparison of the readback signal f(n) and FIR filter output g(n) when the read head is at the track centerline, at +3 nm radial offset from the track centerline, and at −3 nm radial offset from the track centerline.

FIG. 11 shows a comparison of the sampled readback signal f(n) and FIR filter output g(n) when the read head is at the track centerline, at +3 nm radial offset from the track centerline, and at −3 nm radial offset from the track centerline. When the read head is located at the track centerline, the FIR filter output g(n) from Field-A (see FIG. 4) becomes a straight line and the amplitude becomes zero. This is the ideal case, and usually the readback signal f(n) will have some noise so g(n) will also have some noise. The amplitude of g(n) from Field-A increases in proportion to the offset amount from the track centerline. Also, the phase of g(n), Equation (11), changes 180 degrees between plus and minus read head offset from the track centerline. This is shown by comparing the first peak 710 of g(n) when the read head is at +3 nm with the first peak 712 of g(n) when the read head is at −3 nm. So, this phase difference can be used to select the offset direction from the track centerline.

Figure 12:
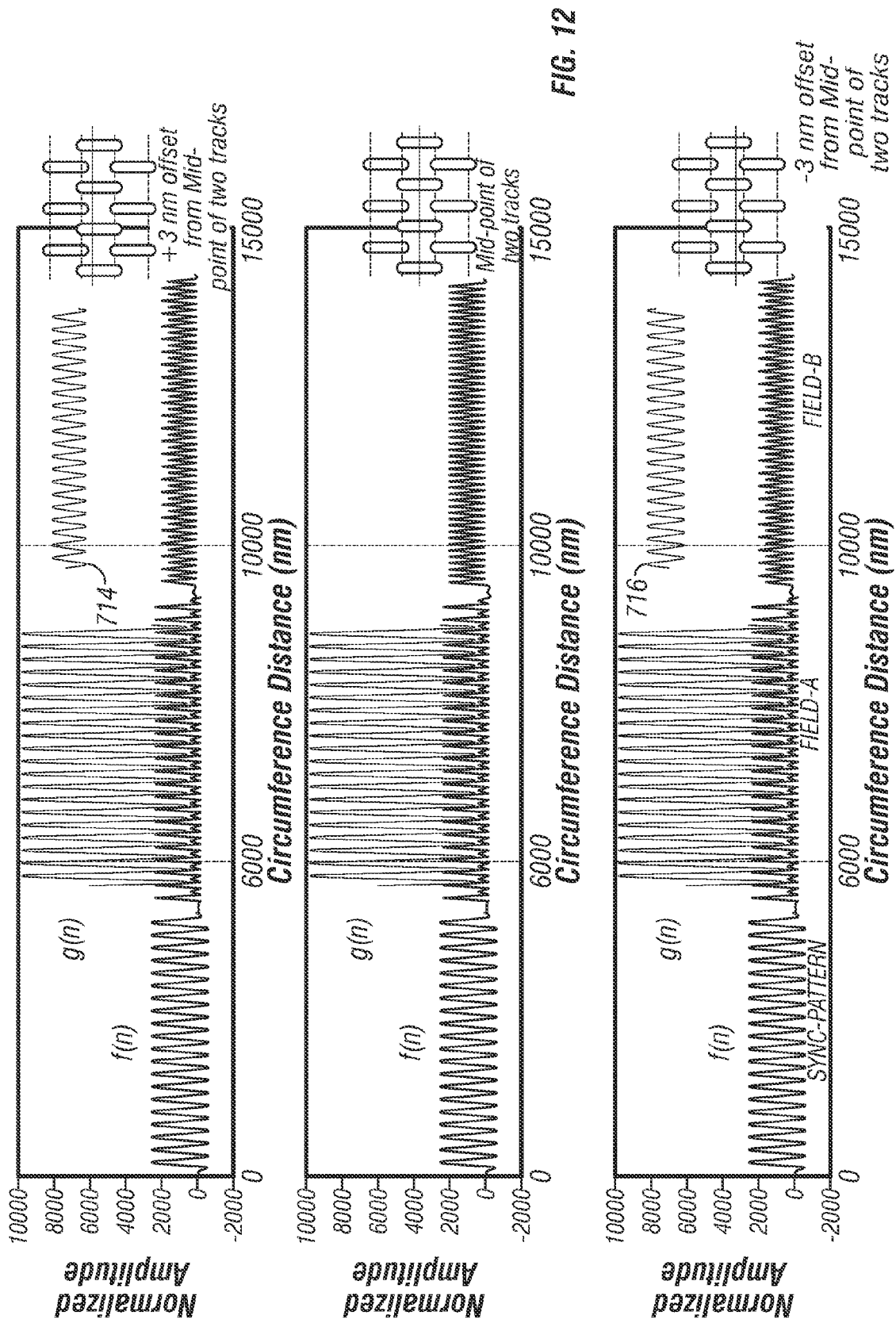
FIG. 12 shows a comparison of the readback signal f(n) and FIR filter output g(n) when the read head is at the midpoint between two track centerlines, at +3 nm radial offset from the midpoint between two track centerlines, and at −3 nm radial offset from the midpoint between two track centerlines.

FIG. 12 shows a comparison of the sampled readback signal f(n) and FIR filter output g(n) when the read head is at the midpoint between two track centerlines, at +3 nm radial offset from the midpoint between two track centerlines, and at −3 nm radial offset from the midpoint between two track centerlines. When the read head is located at the midpoint between two track centerlines, the FIR filter output g(n) from Field-B (see FIG. 4) becomes a straight line and the amplitude becomes zero. This is the ideal case, and usually the readback signal f(n) will have some noise so g(n) will also have some noise. The amplitude of g(n) from Field-B increases in proportion to the offset amount from the midpoint between two track centerlines. Also, the phase of g(n), Equation (11), changes 180 degrees between plus and minus read head offset from the midpoint between two track centerlines. This is shown by comparing the first peak 714 of g(n) when the read head is at +3 nm with the first peak 716 of g(n) when the read head is at −3 nm. So, this phase difference can be used to select the offset direction from the midpoint between two track centerlines.

Figure 13A:
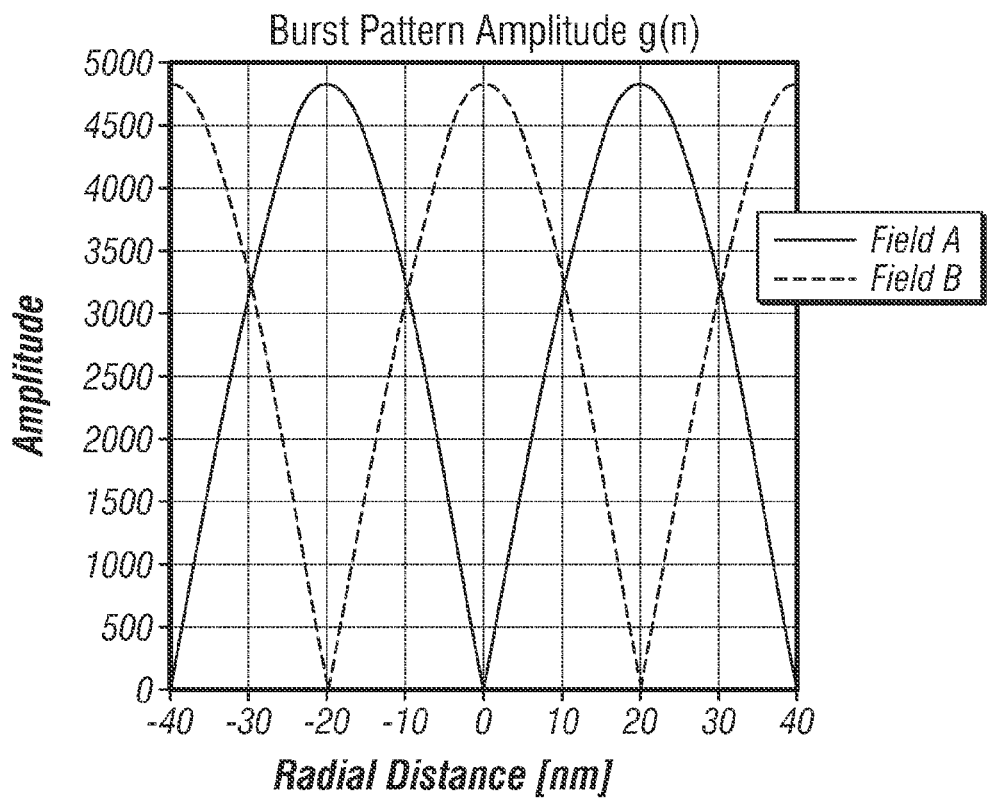
FIGS. 13A and 13B show the FIR filter output g(n) amplitude and phase, respectively, as a function of read head radial position.
Figure 13B:
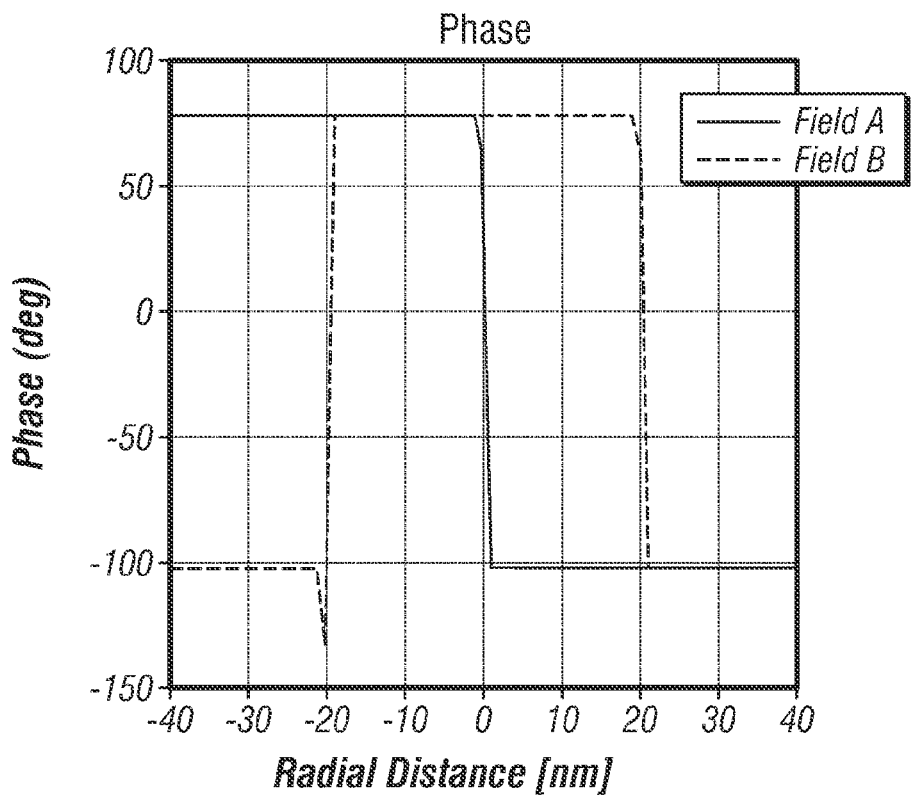

FIGS. 13A-13B show the FIR filter output g(n) amplitude (FIG. 13A) and phase (FIG. 13B) as a function of read head radial position, as calculated by DFT block 620 (FIG. 8). The g(n) amplitude for Field-A is proportional to the read head radial offset from the track centerline around the track centerline. The g(n) amplitude for Field-B is proportional to the read head offset from the midpoint of two adjacent track centerlines. The amplitude does not indicate the read head offset direction. However, the g(n) phase information is used to select the read head offset direction. The phase for Field-A changes 180 degrees at the track centerline, and the phase for Field-B changes 180 degrees at the midpoint of two adjacent track centerlines. The phase values depend on the sampling start point, but the phase value relationship between Field-A and Field-B is fixed. So one method to select the read head offset direction is to determine the difference in the phases of Field-A and Field-B. For example, as shown in FIG. 13B, if the phases of Field-A and Field-B are the same (+80 deg. in FIG. 13B), then the read head is located between −20 and 0 nm from the track centerline. However, if the phases of Field-A and Field-B are different (−100 deg for Field-A and +80 deg for Field-B in FIG. 13B), then the read head is located between 0 and +20 nm from the track centerline.

Figure 14:
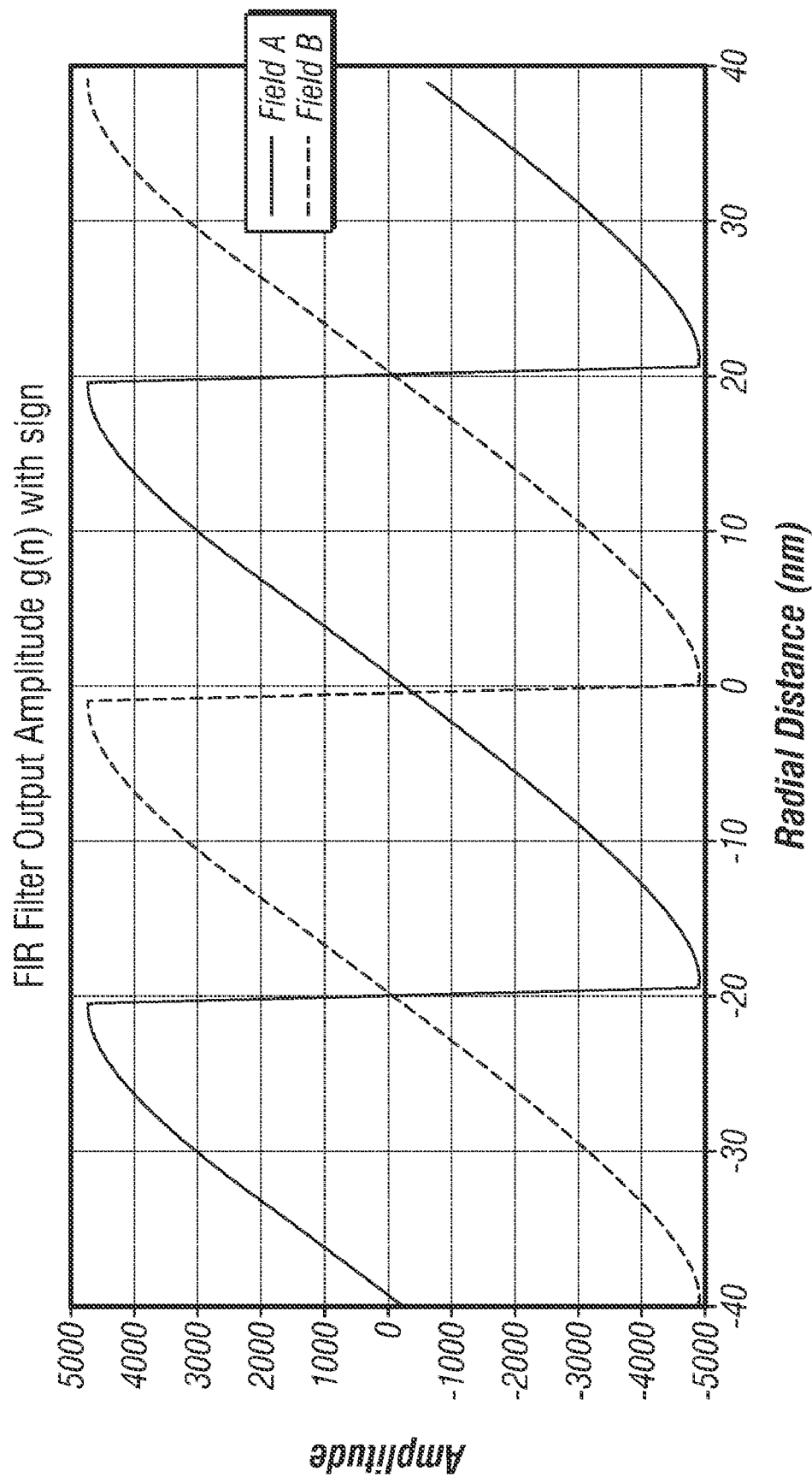
FIG. 14 shows the FIR filter output g(n) amplitude with compensation for read head direction as determined by the g(n) phase values for Field-A and Field-B.

FIG. 14 shows the FIR filter output g(n) amplitude with compensation for read head direction as determined by the g(n) phase values for Field-A and Field-B. The horizontal axis is the read head radial position, where "0" corresponds to the track centerline. The FIR Filter output amplitude in Field-A is almost linear around the track centerline (near 0). The FIR Filter output amplitude in Field-B is almost linear around the midpoint between two adjacent track-centers (near ±20 nm).

Figure 15:
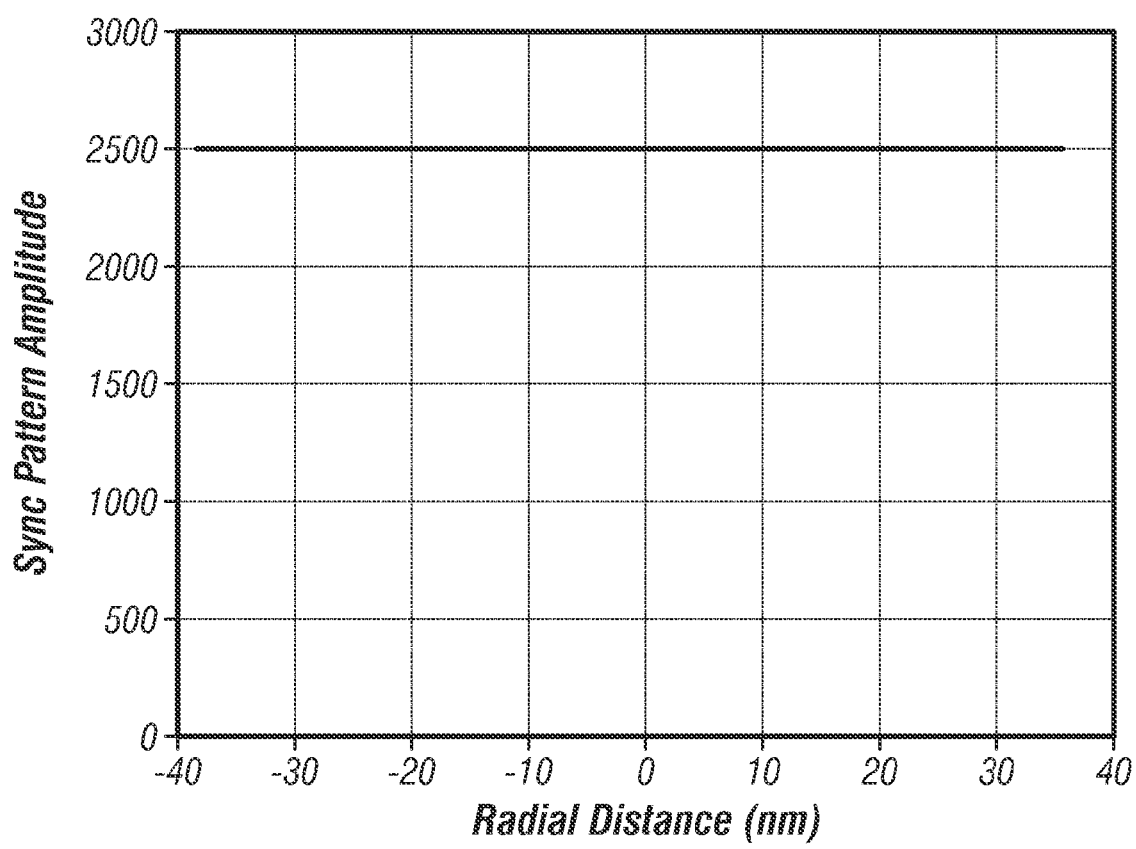
FIG. 15 is a graph of the calculated amplitude from the synchronization pattern in the readback signal.

FIG. 15 shows an example of the sync pattern amplitude measurement (Equation (7)). The sync pattern amplitude is constant across the entire track width. This amplitude is used to normalize the PES signal.

Figure 16:
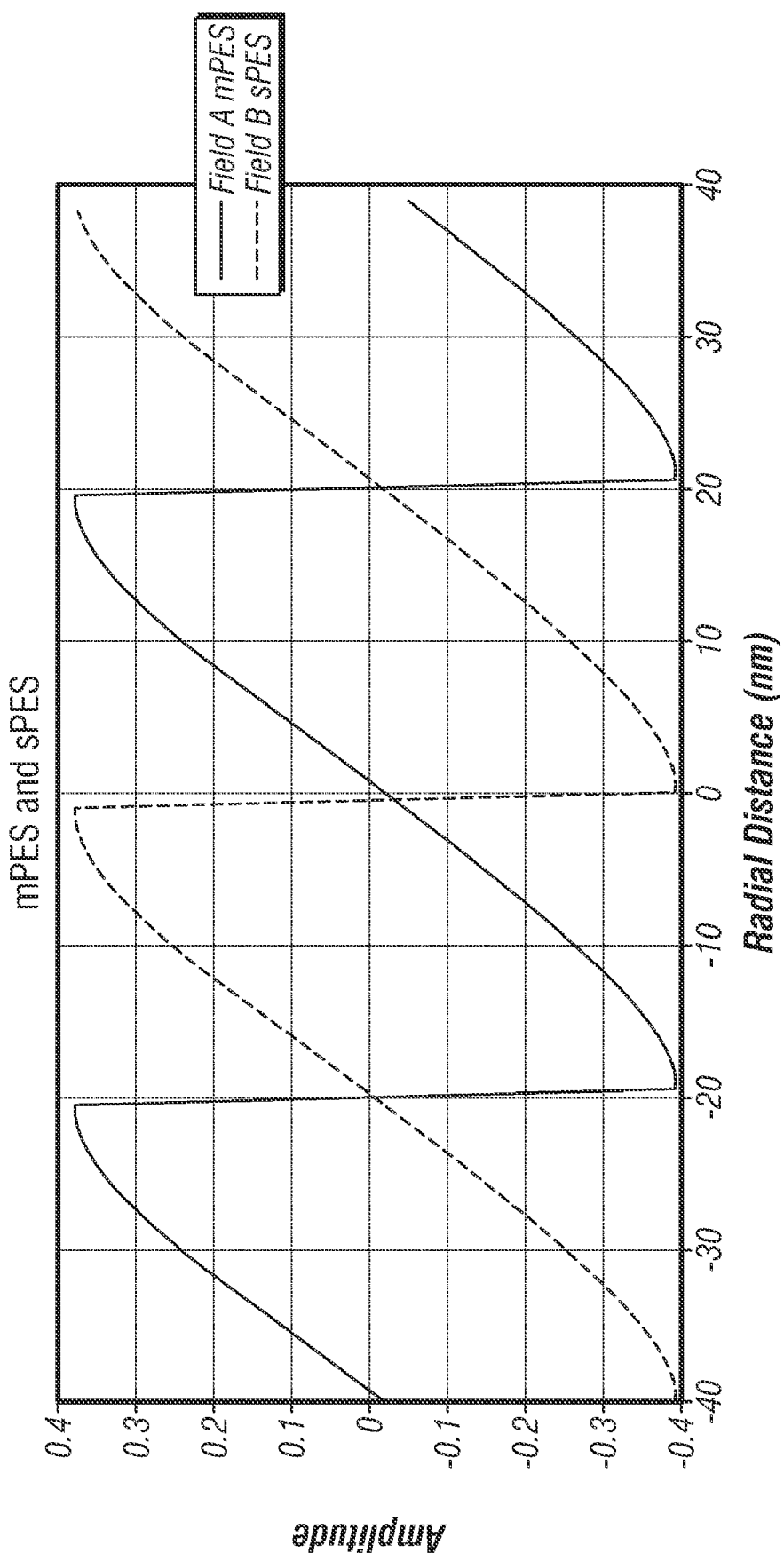
FIG. 16 is a graph of calculated main PES (mPES) and substitute PES (sPES) as a function of read head radial distance from the track centerline.

The next step is calculating mPES and sPES in MPU 630 (FIG. 6) from Equations (1) and (2). In these equations, "Amp_A" and "Amp_B" are the FIR filter output g(n) amplitudes from Field-A and Field-B, respectively. "A_sign" and "B_sign" are positive or negative signs, depending on the phase relationship between the FIR filter output g(n) phases from Field-A and Field-B. The PES values in these equations are normalized by the use of "Amp_Sync". Thus a PES value of 1 corresponds to one track pitch. FIG. 16 shows the calculated values of mPES and sPES as a function of radial distance from the track centerline for the same pattern as FIG. 7 and wherein the gain correction factor "gain_h" is 0.1346.

Figure 17:
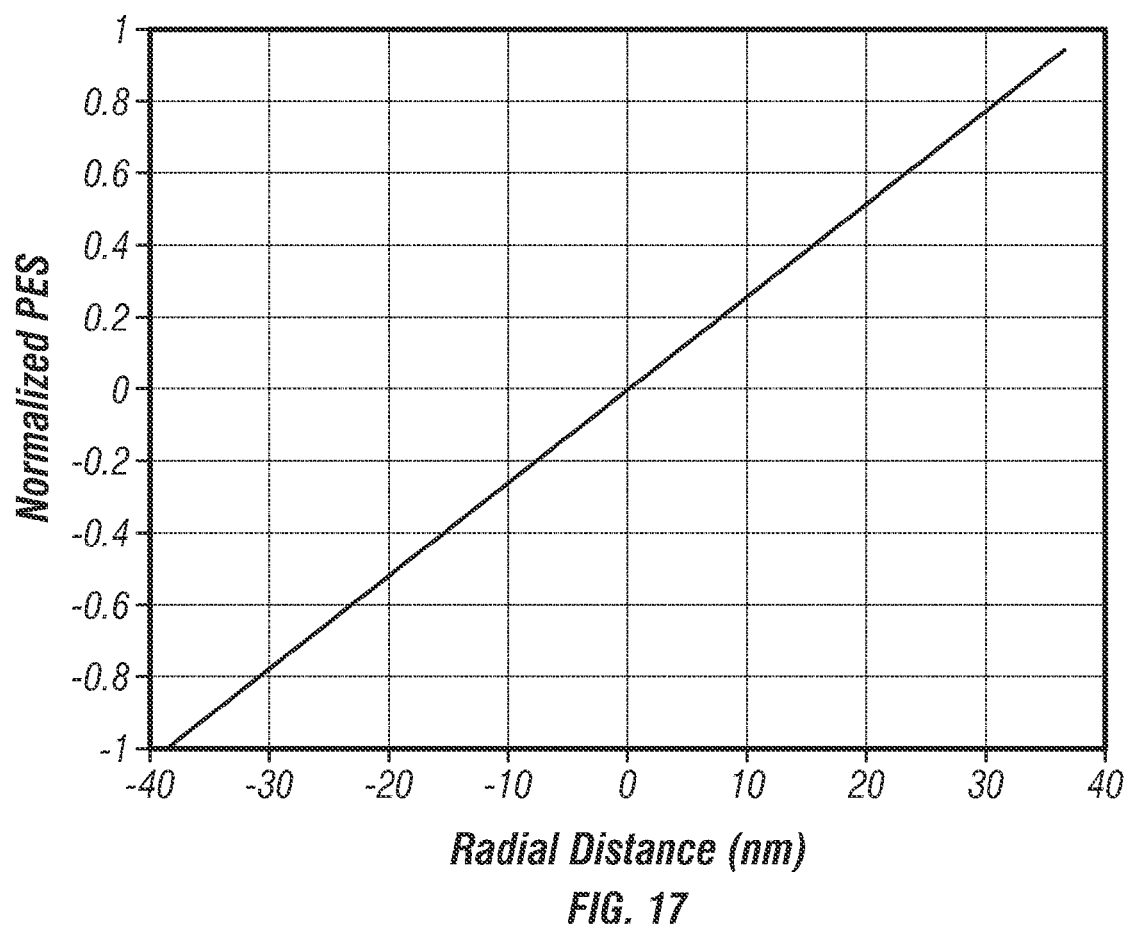
FIG. 17 is a graph of normalized PES as a function of radial distance from the track centerline.

For the final PES calculation, one or the other of the calculated mPES and sPES values is selected, depending on the read head radial location. For the case where the island height equals the single track pitch Tp, mPES is proportional to the read head offset from the track centerline, and sPES is proportional to the read head offset from the midpoint of two track centerlines. The PES to be used is selected from either the mPES or sPES, depending on which one has the lower absolute value. For example, if the absolute value of mPES is less than sPES, this indicates that the read head is located closer to the track centerline. Conversely, if the absolute value of sPES is less than mPES, this indicates that the read head is located closer to the midpoint between two adjacent track centerlines. For example, referring to FIG. 16, if the read head is located at +5 nm, the mPES has an absolute value of about 0.15 and the sPES has an absolute value of about 0.35, so mPES is selected. Similarly, if the read head is located at −15 nm, the mPES has an absolute value of about 0.35 and the sPES has an absolute value of about 0.10, so sPES is selected. Finally, if the selected PES is the sPES value, then a value corresponding to the one-half track constant offset is summed (added or subtracted) with the PES. For example, if one track corresponds to a PES of 1 then a constant offset value of 0.5, corresponding to one-half track, is summed with the PES. FIG. 17 shows the final PES demodulation result. In both FIGS. 16 and 17, the mPES and sPES and final PES values are normalized to 1 for one track width.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk comprising:
   a recording layer of magnetizable material for the recording of data in a plurality of generally concentric circular data tracks, each track having a track centerline and the track centerlines having a track pitch (Tp) radial spacing; and
   a plurality of nondata servo sectors extending generally radially across a plurality of the data tracks, the servo sectors comprising (a) a synchronization pattern of generally radially directed generally equally angularly spaced magnetized marks separated by nonmagnetic spaces, (b) a first position-error-signal (PES) field comprising generally radially directed generally equally angularly spaced magnetized stripes having a circumferential pitch ½*Ii and separated by nonmagnetic spaces, each stripe comprising a plurality of discrete islands, each island having a radial height of approximately Tp and a circumferential width Wd less than ½*Ii, each island being centered approximately halfway between two adjacent track centerlines, the islands at the same radial location in alternating stripes having a circumferential pitch Ii and the islands in alternating stripes in the along-the-track direction being shifted radially by approximately Tp, and (c) a second PES field angularly spaced from said first field and comprising generally radially directed generally equally angularly spaced magnetized stripes having a circumferential pitch ½*Ii and separated by nonmagnetic spaces, each stripe comprising a plurality of discrete islands, each island having a radial height of approximately Tp and a circumferential width Wd less than ½*Ii, each island being centered approximately at the track centerlines, the islands at the same radial location in alternating stripes having a circumferential pitch Ii and the islands in alternating stripes in the along-the-track direction being shifted radially by approximately Tp;
   wherein the islands in the second PES field are shifted radially relative to the islands in the first PES field by approximately one-half Tp, and wherein all of the islands in both of said fields have a magnetization in the same direction.

2. The disk of claim 1 wherein the angular spacing of the marks in the synchronization pattern is twice the angular spacing of the stripes in the first and second fields.

3. The disk of claim 1 wherein the angular spacing between the first and second fields is an integer multiple of the angular spacing of the stripes in each field.

4. The disk of claim 1 wherein each of the islands has a shape selected from generally rectangular and generally circular.

5. The disk of claim 1 wherein said direction of magnetization is substantially parallel to the plane of the recording layer.

6. The disk of claim 1 wherein said direction of magnetization is substantially perpendicular to the plane of the recording layer.

7. The disk of claim 1 wherein the data tracks are patterned into discrete data islands of magnetizable material separated by nonmagnetic spaces.

8. The disk of claim 1 wherein the data tracks are continuous magnetizable material of the recording layer.

9. The disk of claim 1 wherein the data tracks are discrete data tracks of continuous magnetizable material of the recording layer separated by concentric nonmagnetic guard bands.

10. A patterned-media perpendicular magnetic recording disk comprising:
    a substrate; and
    a recording layer of magnetizable material on the substrate and patterned into
    (a) a plurality of generally concentric circular data tracks, each track having a track centerline and the track centerlines having a track pitch (Tp) radial spacing, and each data track containing discrete data islands of magnetizable material; and
    (b) a plurality of nondata servo sectors extending generally radially across a plurality of the data tracks, the servo sectors comprising (i) a synchronization pattern of generally radially directed generally equally angularly spaced magnetized marks separated by nonmagnetic spaces, and two and only two position-error-signal (PES) fields, said PES fields consisting of (ii) a first PES field comprising generally radially directed magnetized stripes separated by nonmagnetic spaces, each stripe comprising a plurality of discrete islands, each island having a radial height of approximately Tp and being centered approximately halfway between two adjacent track centerlines, and the islands in alternating stripes in the along-the-track direction being shifted radially by approximately Tp, and (iii) a second PES field angularly spaced from said first field and comprising generally radially directed magnetized stripes separated by nonmagnetic spaces, each stripe comprising a plurality of discrete islands, each island having a radial height of approximately Tp and being centered approximately at a track centerline, and the islands in alternating stripes in the along-the-track direction being shifted radially by approximately Tp; and wherein the islands in the second PES field are shifted radially relative to the islands in the first PES field by approximately one-half Tp, wherein each island has a circumferential width Wd and the nonmagnetic space between circumferentially adjacent islands at the same radial location is greater than Wd, and wherein all of the islands in both of said PES fields are magnetized in the same direction substantially perpendicular to the recording layer.

11. The disk of claim 10 wherein the angular spacing between the first and second PES fields is an integer multiple of the angular spacing of the stripes.

12. The disk of claim 10 wherein each of the islands has a shape selected from generally rectangular and generally circular.

13. A magnetic recording disk drive comprising:
a rotatable magnetic recording disk comprising:
   a substrate; and
   a recording layer of magnetizable material on the substrate and patterned into
      (a) a plurality of generally concentric circular data tracks, each track having a track centerline and the track centerlines having a track pitch (Tp) radial spacing, and each data track containing discrete data islands of magnetizable material; and
      (b) a plurality of nondata servo sectors extending generally radially across a plurality of the data tracks, the servo sectors comprising (i) a synchronization pattern of generally radially directed generally equally angularly spaced magnetized marks separated by nonmagnetic spaces, and two and only two position-error-signal (PES) fields, said PES fields consisting of (ii) a first PES field comprising generally radially directed magnetized stripes separated by nonmagnetic spaces, each stripe comprising a plurality of discrete islands, each island having a radial height of approximately Tp and being centered approximately halfway between two adjacent track centerlines, and the islands in alternating stripes in the along-the-track direction being shifted radially by approximately Tp, and (iii) a second PES field angularly spaced from said first field and comprising generally radially directed magnetized stripes separated by nonmagnetic spaces, each stripe comprising a plurality of discrete islands, each island having a radial height of approximately Tp and being centered approximately at a track centerline, and the islands in alternating stripes in the along-the-track direction being shifted radially by approximately Tp; and wherein the islands in the second PES field are shifted radially relative to the islands in the first PES field by approximately one-half Tp, and wherein all of the islands in both of said PES fields are magnetized in the same direction substantially perpendicular to the recording layer;

a write head that writes data in the data islands of the data tracks;

a read head that reads data from the data islands in the data tracks and detects the magnetized marks in the synchronization pattern and the magnetized islands in the first and second PES fields, the read head generating a servo signal from the marks and islands as the disk rotates;

an actuator connected to the heads for positioning the heads to different data tracks and maintaining the heads on the tracks; and servo electronics responsive to the servo signal for generating a position error signal (PES) for controlling the actuator, the servo electronics including a finite impulse response (FIR) filter for generating a signal representing the moving average of the servo signal from the first PES field and the second PES field, and a processor for calculating (a) the amplitude of the servo signal from the synchronization pattern, (b) the amplitudes of the moving average signal from the first PES field and the second PES field, (c) the phases of the moving average signal from the first PES field and the second PES field, and (c) the PES from said calculated amplitudes and phases.

14. The disk drive of claim 13 further comprising memory associated with the processor and containing computer program instructions for performing the processor-implemented steps of:
   calculating a main PES (mPES) from the calculated amplitude of the servo signal from the synchronization pattern and the calculated amplitude of the moving average signal from the first PES field;
   calculating a substitute PES (sPES) from the calculated amplitude of the servo signal from the synchronization pattern and the calculated amplitude of the moving average signal from the second PES field;
   determining the signs of the calculated mPES and sPES from said calculated phases;
   selecting one of the mPES and the sPES as the PES depending on which has the lower absolute value; and
   if the sPES is selected as the PES, summing a constant offset value with the PES.

* * * * *